(12) United States Patent
Frohwein

(10) Patent No.: US 12,304,693 B2
(45) Date of Patent: May 20, 2025

(54) PORTABLE CONTAINER SYSTEM

(71) Applicant: Smart Container Holdings, LLC, Orlando, FL (US)

(72) Inventor: Daniel M. Frohwein, Orlando, FL (US)

(73) Assignee: Smart Container Holdings, LLC, Orlando, FL (US)

( * ) Notice: Subject to any disclaimer, the term of this patent is extended or adjusted under 35 U.S.C. 154(b) by 80 days.

(21) Appl. No.: 18/295,322

(22) Filed: Apr. 4, 2023

(65) Prior Publication Data
US 2023/0356883 A1    Nov. 9, 2023

Related U.S. Application Data

(63) Continuation-in-part of application No. 17/661,964, filed on May 4, 2022, now Pat. No. 11,932,444.

(51) Int. Cl.
*B65D 21/02*   (2006.01)
*B65D 25/28*   (2006.01)
*B65D 71/50*   (2006.01)

(52) U.S. Cl.
CPC ..... *B65D 21/0201* (2013.01); *B65D 25/2858* (2013.01); *B65D 71/50* (2013.01)

(58) Field of Classification Search
CPC .. B65D 21/0201; B65D 21/0204; B65D 1/24; B65D 77/048; A45C 11/20; A61J 1/16
USPC ............. 220/23.2; 211/78; 222/142.3, 142.4, 222/142.5
See application file for complete search history.

(56) References Cited

U.S. PATENT DOCUMENTS

| | | | | |
|---|---|---|---|---|
| 225,143 | A * | 3/1880 | Kahler | A47G 19/24 220/253 |
| 1,977,092 | A * | 10/1934 | Scurlock | A47G 23/08 D7/615 |
| 2,030,899 | A * | 2/1936 | Scurlock | A47G 23/08 211/144 |

(Continued)

FOREIGN PATENT DOCUMENTS

KR    20110003585 U    1/2011

OTHER PUBLICATIONS

Notification of Transmittal of the International Search Report and Written Opinion; PCT/US23/66167; dated Aug. 28, 2023 (3 pages).

*Primary Examiner* — Ernesto A Grano
*Assistant Examiner* — Symren K Sanghera
(74) *Attorney, Agent, or Firm* — Jason T. Daniel, Esq.; Daniel Law Offices, P.A

(57) ABSTRACT

The portable container system includes a central locking hub that assembles a collection of containers into a carrying unit. The hub is cylindrical in shape and the containers are angular wedges projecting horizontally outward from the hub. Each container includes a vessel with a defined interior volume, and a lid. The containers are reversibly secured to the hub when the containers are received around the hub base, and the hub upper part is secured to the base, thereby locking the containers in place. A registration apparatus, comprising reciprocal pairs of extrusions and depressions in a circular pattern, is integrated within and between the mating surfaces of the central hub, and the containers. When the carrying unit arrives at its destination, the hub upper section is removed from the base. The user may then remove the containers as they see fit.

20 Claims, 26 Drawing Sheets

(56) References Cited

U.S. PATENT DOCUMENTS

| | | | | |
|---|---|---|---|---|
| 2,514,416 | A * | 7/1950 | Plunkett | B65D 47/263 |
| | | | | 222/142.3 |
| 4,886,179 | A | 12/1989 | Volk | |
| 6,131,772 | A * | 10/2000 | Robbins | A47F 1/035 |
| | | | | 220/675 |
| 7,097,037 | B1 * | 8/2006 | Keffeler | B65D 21/0202 |
| | | | | 206/532 |
| 7,156,226 | B1 * | 1/2007 | Van Sickle | A47J 47/16 |
| | | | | 206/1.5 |
| 8,302,787 | B2 * | 11/2012 | Tobey | A61J 1/16 |
| | | | | 211/77 |
| 2005/0072711 | A1 * | 4/2005 | Yang | F25D 3/08 |
| | | | | 206/499 |
| 2008/0011697 | A1 * | 1/2008 | Berg | A47B 49/00 |
| | | | | 211/10 |
| 2018/0057207 | A1 * | 3/2018 | Maroofian | B65D 21/0206 |
| 2021/0309416 | A1 * | 10/2021 | Grella | B25G 1/06 |
| 2022/0112010 | A1 * | 4/2022 | Darst | B65D 50/045 |

\* cited by examiner

PORTABLE CONTAINER SYSTEM

RELATED APPLICATIONS

This application is a continuation-in-part of U.S. patent application Ser. No. 17/661,964 titled Reusable food transportation device, filed May 4, 2022.

FIELD

This invention relates to the field of food storage and more particularly to a device for transportation of a selection of food containers.

BACKGROUND

A food storage container must serve many purposes, including physical protection, barrier protection, containment, portion control, convenience and security (tamper resistance). Additionally, a food container may provide visible information and marketing to the customer. There are an innumerable variety of containers designed to contain and transport food in the current art.

These containers are divided into two main groups: those that are destined to be single-use and disposable, and those designed for reuse.

Single-use containers are generally associated with takeout and food-delivery services, as well as for transporting smaller quantities of prepared foods or ingredients from grocery stores, specialty food outlets, and the like. They are also utilized to provide left-over food to patrons from dine-in establishments. They may be recyclable or compostable, but are generally single-use items. They are found in a variety of rectangular and circular shapes and materials ranging from aluminum foil tins with flat cardboard lids, to plastic container and lid combinations, paperboard boxes, delicatessen containers, polystyrene (Styrofoam) clamshell containers, even the ubiquitous and iconic Chinese food takeout box.

Reusable food containers are generally considered for personal use and have found acceptance in the daily preparation, transportation, and consumption of food at school, work or during other outings. Like their single-use counterparts, they are generally round or rectangular in shape, and may contain internal partitions to segregate food contents. They are constructed generally from food-grade plastic materials, glass, or stainless steel. These consumer goods come individually and sometimes in coordinated sets of varying sizes.

The rise of appealing cellphone app-based food delivery services has allowed the concept of food delivery to progress beyond the customary neighborhood pizza parlor, sandwich shop, and Chinese food offerings. Now, restaurant-quality cuisine of virtually any type is available at the tap of a button. As an industry, the use of online food delivery (OLFD) apps has increased significantly in recent years. This trend is governed by a variety of factors, including the proliferation of mobile devices and the rise of on-demand services, as well as changes in consumer behavior and preferences. The Covid-19 pandemic has had a significant impact on the food delivery industry, with many people turning to these services to get meals while practicing social distancing. As pandemic-era related restaurant closures and social distancing practices waned, the demand for food-delivery services continued to increase, albeit at a slower rate. Indeed, data collected during the summer of 2022 showed that 42% of U.S. adults were ordering takeout an average of three times per week. With the increase in these OLFD services poised to remain a permanent fixture in dining, there has naturally been a proportionate increase in the utilization of single-use takeout food containers. These food containers are mainly single use, and while some may be recyclable or compostable, they are not reliably so.

Single-use plastic grocery bags and food containers are two of the top four plastic pollutants found in the oceans today. In a large and well-conducted research study from 2021, a full 44% of maritime plastic waste was related to takeout and delivery food services. Governments in the US are taking notice with legislative mandates at local and state levels. Countries around the globe are also recognizing the problem with increasing numbers of bans on single-use plastics. In 2019, the global plastic treaty, also known as the United Nations Environmental Programme (UNEP) Global Plastic Pact, was launched. This is an initiative whose goal is to reduce the deleterious impacts of plastic on human health and the environment. In March of 2022, the UN Environment Assembly (UNEA-5.2) endorsed a resolution to forge an internationally legally binding agreement by 2024. The resolution established an Intergovernmental Negotiating Committee (INC), which plans to conduct five meetings, the first being held in November 2022, with the goal of completing a draft global legally binding instrument.

It is self-evident that there is an urgent need to develop a robust, reusable food storage, transport and delivery system. Such a container system should obliviate the need for single-use plastic food containers and the bags they are transported in. A reusable food container and delivery system would be an implementation of the 'circular economy' in which it is recognized that the Earth's natural resources, and its capacity to dispose of human waste, are both finite. Upon a normal food delivery scenario with the reusable container system, once the food is consumed by the receiving party, the container system would then be returned, via reverse logistics mechanisms, to a receiving source for sanitation and redeployment.

Despite the substantial environmental and health benefits to such a system, there are numerous other advantages. For the food delivery customer, the consumer enjoys delivery in hygienic, robust, and tamper-resistant containers which allow for segregation and temperature maintenance, as well as direct food consumption. Consistent portioning in the containers allows for nutritional information to be gleaned, and therefore meaningful relative comparisons made between foodstuffs to be obtained.

Restaurants who participate in providing their menu items in the container derive the benefit of eliminating the need to purchase single-use food takeout containers. Additionally, food proprietors can accurately and reliably portion take-out servings, allowing for improved inventory control. Restaurants will have access to customers who are participating in the initiative to reduce waste by preferentially patronizing establishments that utilize reusable food containers. Restaurants may also develop new menu options and preparations to take advantage of the container sizes and configurations, essentially designing their menu options 'from the container up.' Chefs can showcase their presentations of individual food items while simultaneously demonstrating dramatic flavor, texture, and temperature combinations by keeping their food creations segregated. Crispy items stay crisp and separated from their moist gustatory counterparts.

Outside of food delivery services, the container system can find acceptance in many other commercial environments and industries, including hotels and resorts, vacation theme parks, convention centers, cruise ships, fast-casual food establishments, cafeterias, food courts, schools, the airline industry, senior living facilities, hospitals, and other institutional settings.

SUMMARY

The portable container system includes a central docking hub that assembles a collection of containers into a carrying unit. The hub is cylindrical in shape, and comprises a hub upper part and a hub base. The containers have proximal angular corners projecting horizontally inward to allow interaction with the hub. Each container includes a vessel with a defined interior volume, and a lid.

The hub upper part and hub base can include a circular registration feature, consisting of a protruding rib or recessed groove, and the lid and vessel of each container can include a corresponding reciprocal groove or rib. Such combinations of ribs and grooves comprise registration apparatuses. These registration features may be in a continuous or discontinuous circular pattern. Stated differently, the extruded rib, or protruding rib, can be a full circle or a segment of a circle. If the section of a circle is a half-circle it is referred to as a semicircle. The registration apparatuses set the locations with which the lid or vessel interact with the hub.

Registration apparatuses can also include pairings of protrusions and slots, or pegs and holes. By regular and repeating placement of these registration features, the angular position of food containers is assigned with respect to the central hub.

In the preferred embodiment, the hub base and the container vessel include mating registration features to assign the angular position of the associated container.

The function of the registration features is to assist in alignment of the container with respect to the hub base, and prevention of radial rotation or horizontal outward displacement of the containers when they are secured to the hub.

Before transportation, the containers are filled and placed circumferentially around the hub base. The hub top is then reversibly secured to the base. This compresses each lid against its respective vessel and aggregates multiple containers together into a single carrying unit. The registration apparatus integrated within and between the mating surfaces of the central hub parts aligns and locks the containers to the hub when the hub upper part is secured to the hub base.

When the device arrives at its destination, the hub upper part is separated from the base. This removes the compressive force holding the containers. The user may then remove the containers to access the contents as they see fit.

Optionally included in the hub top is a knob with thumb depressions. The knob helps the user to actuate the top part of the hub with respect to the base part of the hub to lock and unlock the upper and lower halves of the hub. Additionally provided is an optional flush-mounted carrying handle, which is deployable by rotating it up into an erect position.

The lids and vessels contain additional registration features. In the preferred embodiments, these take the form of grooves and ribs, comprising an arc of a circle, at fixed distances from the center of the assembled carrying unit. Each lid contains a series of radial grooves or ribs, and its corresponding vessel contains complimentary ribs or grooves of identical radii, respectively. In an assembled container system, the contributing series of ribs or grooves form complete circular raised or depressed registration features. These circular features facilitate stacking by promoting alignment and interlocking of one complete container system upon another. Such an arrangement prevents unwelcome shifting of one container system upon another while multiple units are being carried simultaneously.

Each lid also contains a downward projecting tab, in the center of the peripheral side of the lid. Each vessel possesses a corresponding receiving horizontal holed slot centered in, and projecting outward from the top of its rear vertical wall. When the lid is placed on the vessel, the lid tab engages the container slot, forming a hinged construct that prevents inadvertent displacement of the lid. Additionally, when the container is secured to the central hub, the construct prevents prying open of the lid from the vessel, providing additional security and tamper-resistance.

The locking mechanism may take multiple forms. In one embodiment, the hub upper section threads into the hub base using male and female threaded connections.

In an alternative embodiment, the hub upper section and hub base affix to each other via a latch. In this embodiment, a pin interacts with a bump, or latch, preferably supported by a resilient member. The latch resists backward rotation, maintaining the hub in a locked position. When the user is prepared to unlock the device, the hub upper part and base are again rotated with respect to each other, passing the pin across the latch, allowing removal of the hub upper section from the hub base.

Additional mechanisms of reversable connection that do not require radial rotation of the hub top part upon the hub base, such as a buckle or clasp, may also be employed.

The preferred form factor of the assembled food transport device is circular, however other shapes are anticipated, such as square, pentagon, and so forth. In these instances, the proximal corner of the individual containers remains unchanged, however there is a conformational change of the distal side of the containers.

In the preferred circular embodiment, the individual containers are shaped as wedges. A variety of sizes may be used, referred to by the angular space occupied by each container. For example, 60 degrees, 90 degrees, 120 degrees, and 180 degrees may be anticipated.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
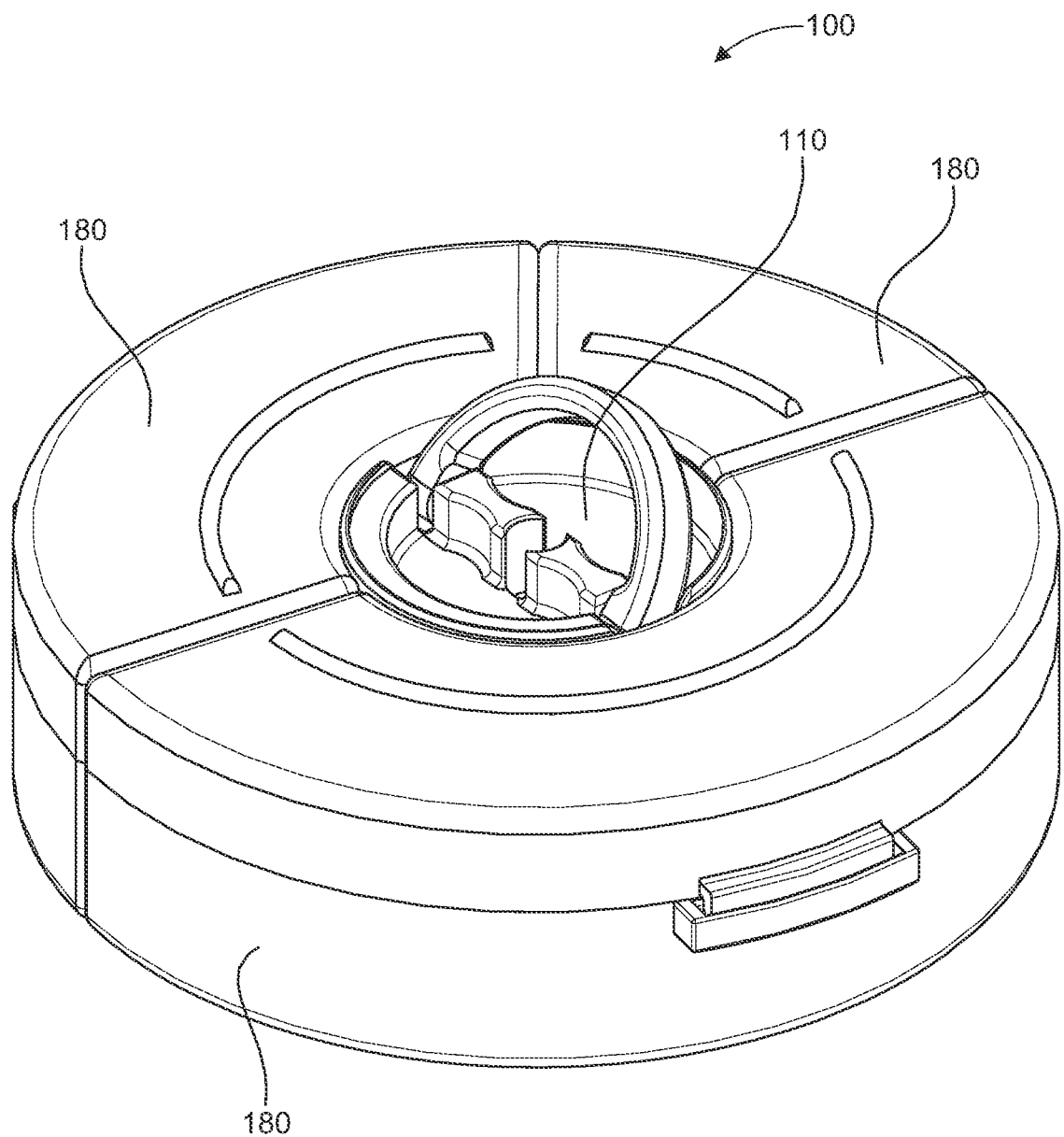
FIG. 1 illustrates a first isometric view of the portable container system.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first isometric view of the portable container system is shown.

The portable container system 100 is shown formed from a hub 110 and multiple containers 180.

Figure 2:
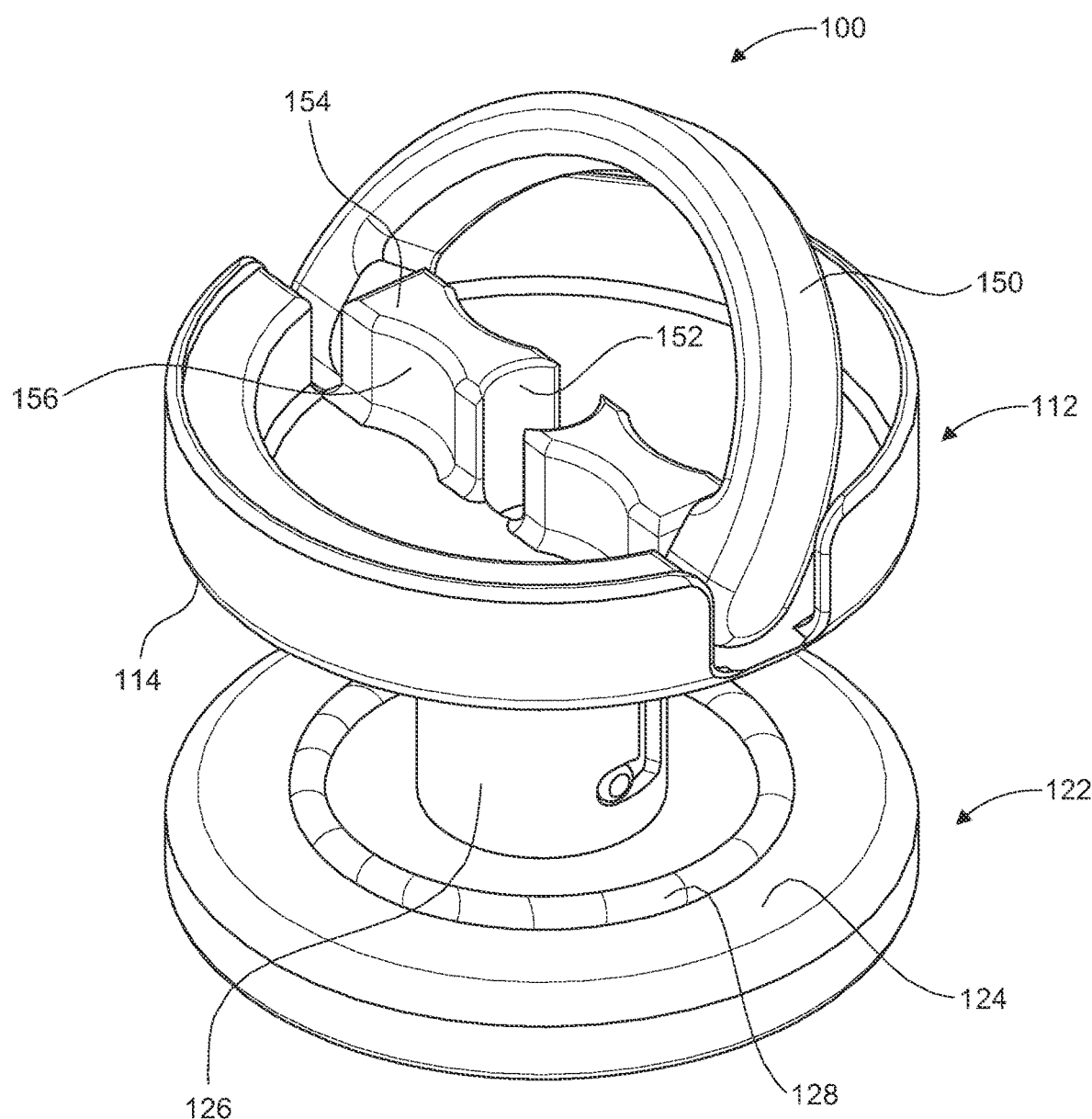
FIG. 2 illustrates a first isometric view of the hub of the portable container system.
Figure 3:
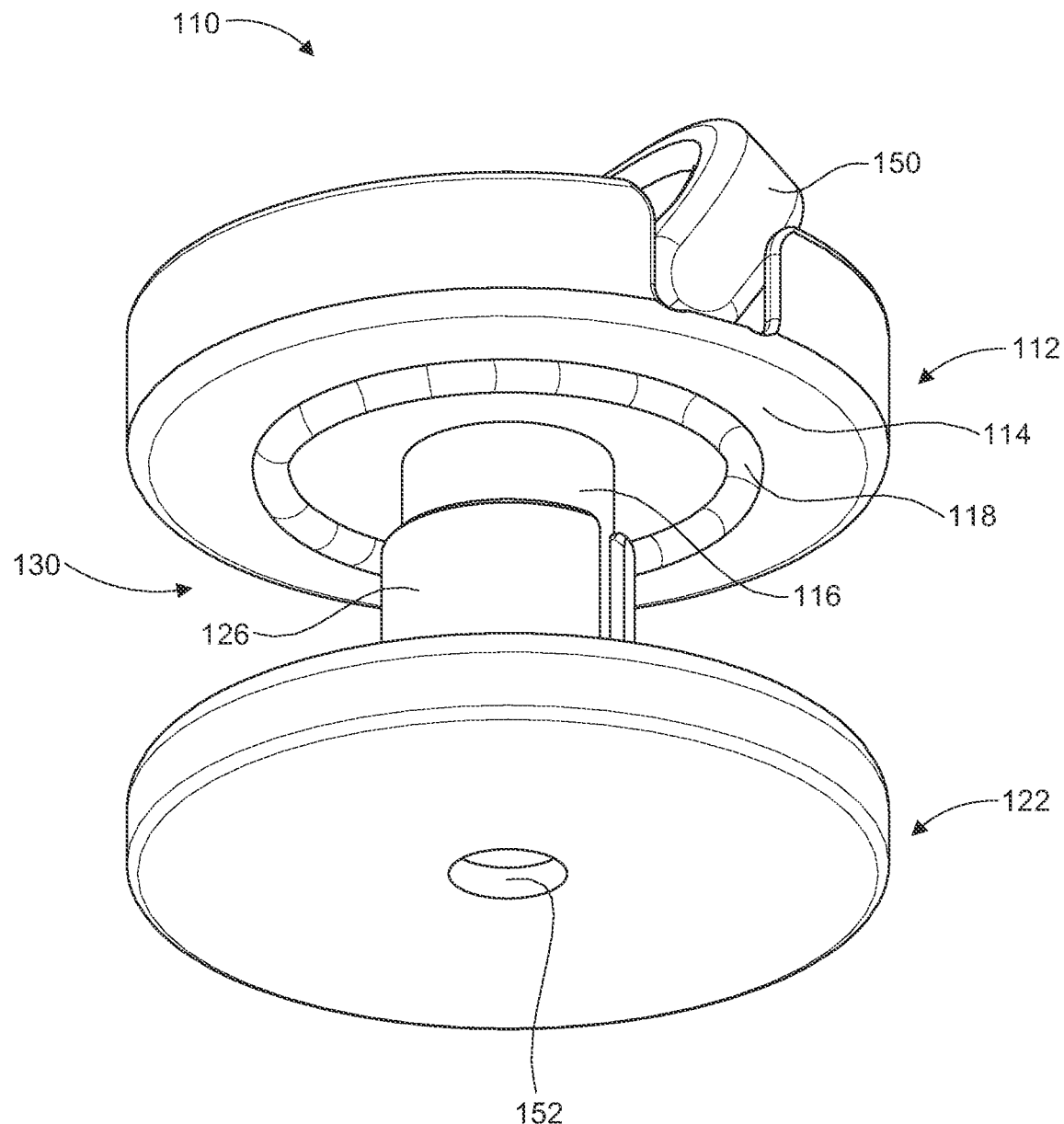
FIG. 3 illustrates a second isometric view of the hub of the portable container system.

Referring to FIGS. 2 and 3, first and second isometric views of the hub of the portable container system are shown.

The hub 110 is shown formed from hub upper section 112 with upper plate 114, upper cylinder 116, and upper rib 118.

Also shown is hub base 122 including lower plate 124.

To align the containers 180 (see FIG. 1), also shown is lower rib 128.

The hub base 122 includes an upwardly projecting lower cylinder 126.

The hub 110 optionally includes a handle 150. An optional alignment opening 152 is an entrance to a hole that passes completely through the hub 110. This allows multiple hubs to be stacked, using a central rod to maintain alignment.

A central knob 154 with thumb depressions 156 facilitates rotation of the hub upper section 112 with respect to the hub base 122, allowing the user to engage and disengage the two sections from each other.

Figure 4:
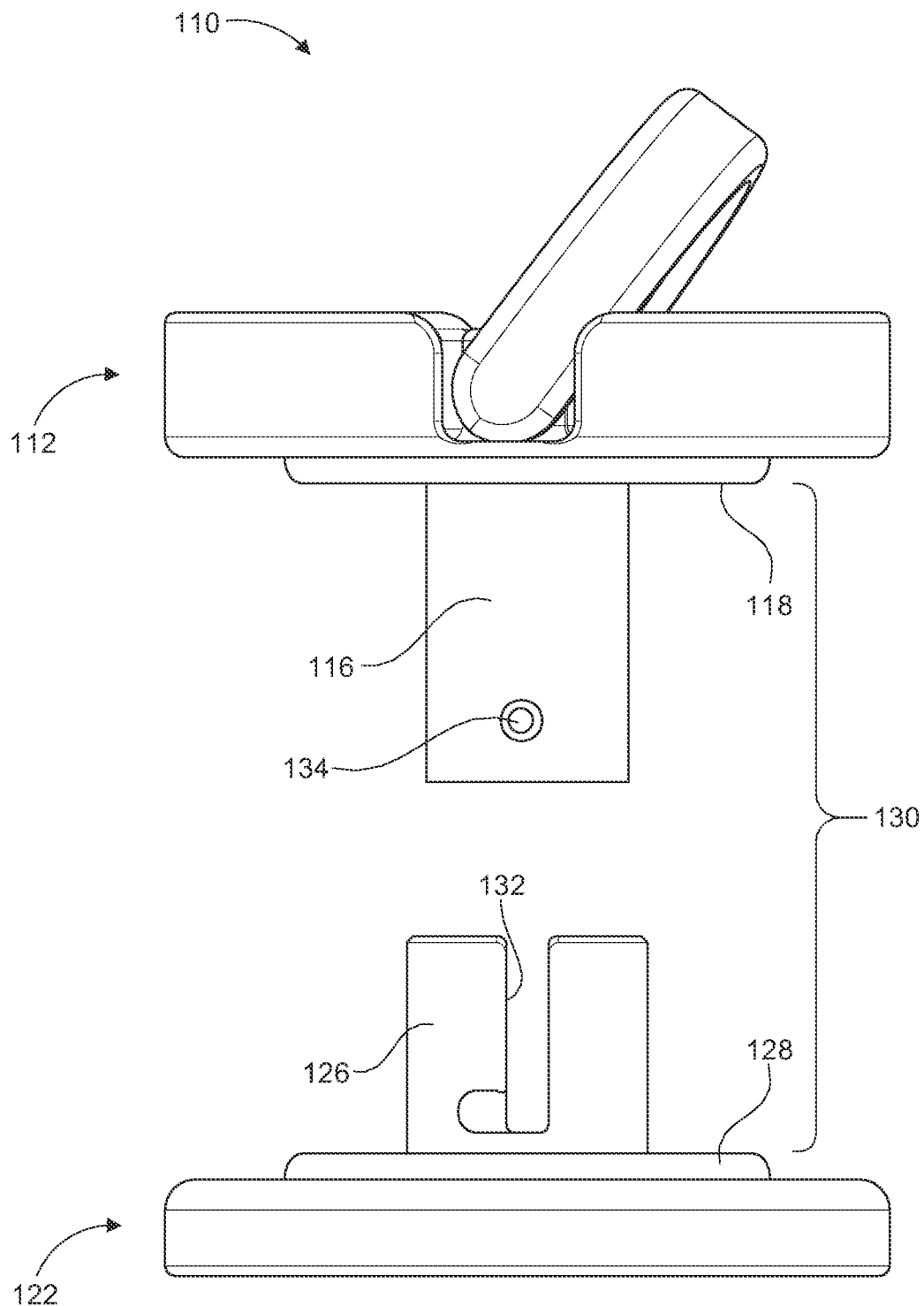
FIG. 4 illustrates a side and partially exploded view of the hub of the portable container system.

Referring to FIG. 4, a side and partially exploded view of the hub of the portable container system is shown.

In this embodiment, the hub upper section 112 and hub base 122 engage and disengage with each other using a twist lock mechanism, or releasable locking mechanism 130.

The releasable locking mechanism 130 is formed from the upper cylinder 116 and lower cylinder 126, which slide together. A slot 132 guides and locks a pin 134, with final rotation causing locking of the pin 134 within the slot 132.

The releasable locking mechanism 130 has a locked position and an unlocked position.

Figure 5:
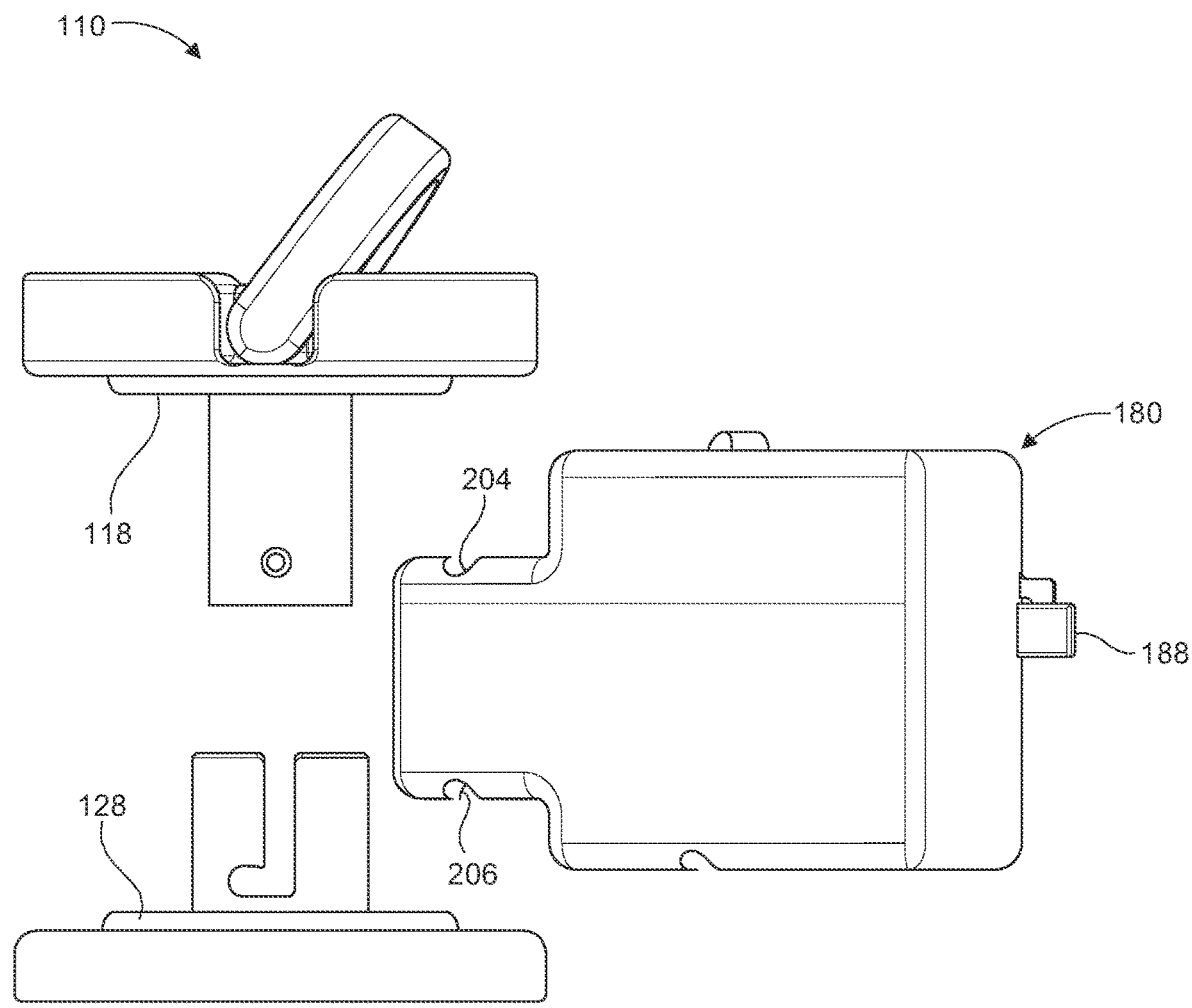
FIG. 5 illustrates a side and partially exploded view of the hub and a single container of the portable container system.

In the locked position, the hub upper section 112 and hub base 122 are held together, compressing a container 180 (see FIG. 5).

In the unlocked position, the hub upper section 112 and hub base 122 are disengaged from each other, allowing the user to remove the hub upper section 112, and correspondingly remove the container 180 (see FIG. 5).

Figure 6:
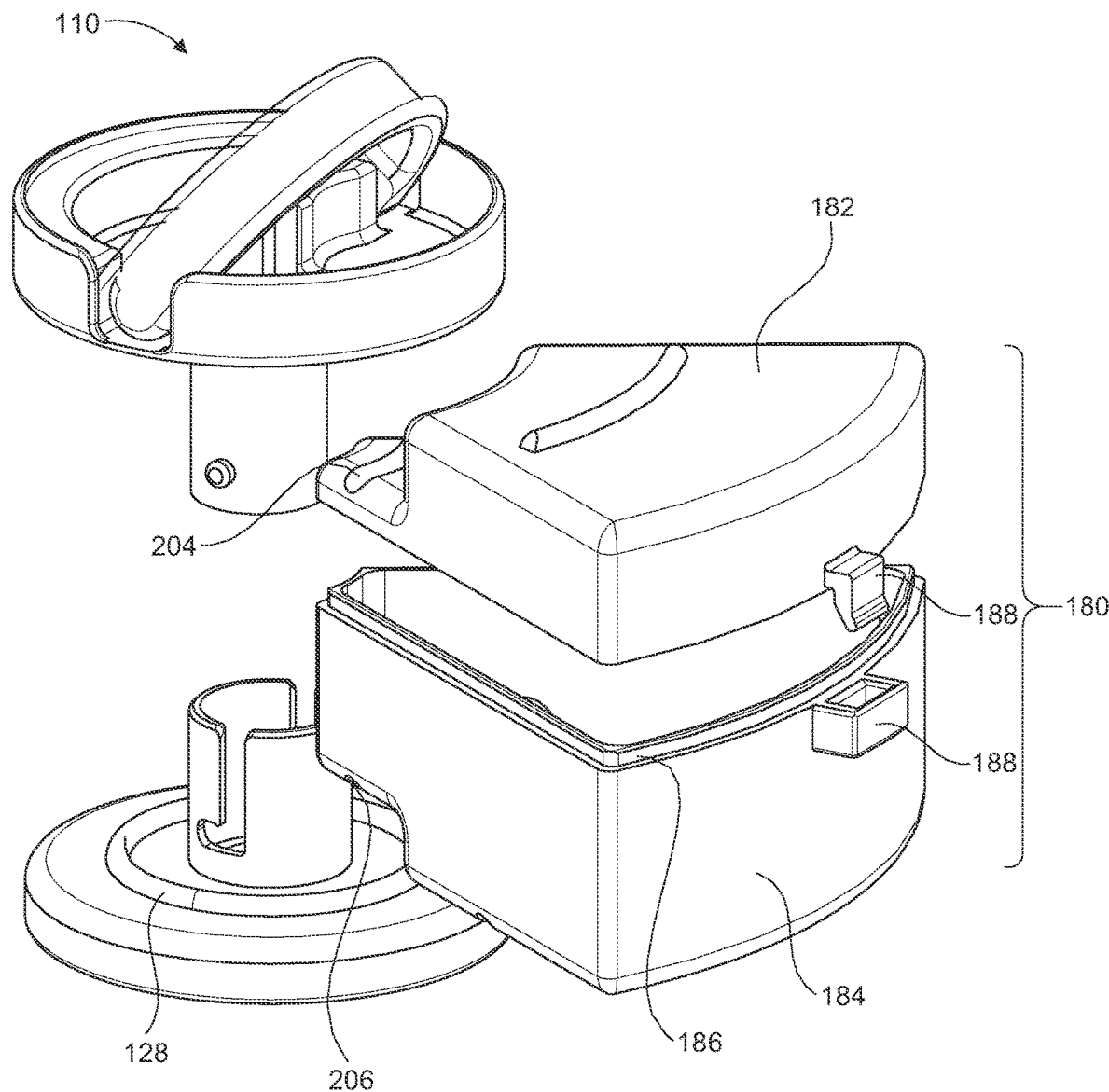
FIG. 6 illustrates an isometric and partially exploded view of the hub and a single container of the portable container system.

Referring to FIGS. 5 and 6, partially exploded side and isometric views of the hub and a single container of the portable container system are shown.

To align the containers 180 with the hub 110, the upper rib 118 and lower rib 128 interface with the lid groove 204 and vessel groove 206, respectively.

The combination of the upper rib 118 in lid groove 204, and/or the combination of the lower rib 128 and vessel groove 206, are referred to as an alignment ring. This is one type of registration apparatus. The alignment ring is considered the confluence of grooves and ribs, with a circular shape that aligns the hub 110 with the one or more containers 180.

When the hub 110 is compressed against a container 180, the container 180 cannot move outward with respect to the hub 110. This prevents the containers from disengaging from the hub 110. The vertical compression holds the containers 180 closed and prevents rotation and dislodgement of the container 180 with respect to the hub 110.

Each container 180 is formed from a lid 182 and vessel 184 that meet at a junction 186. The lid 182 and vessel 184 optionally include a hinge construct 188.

Figure 7:
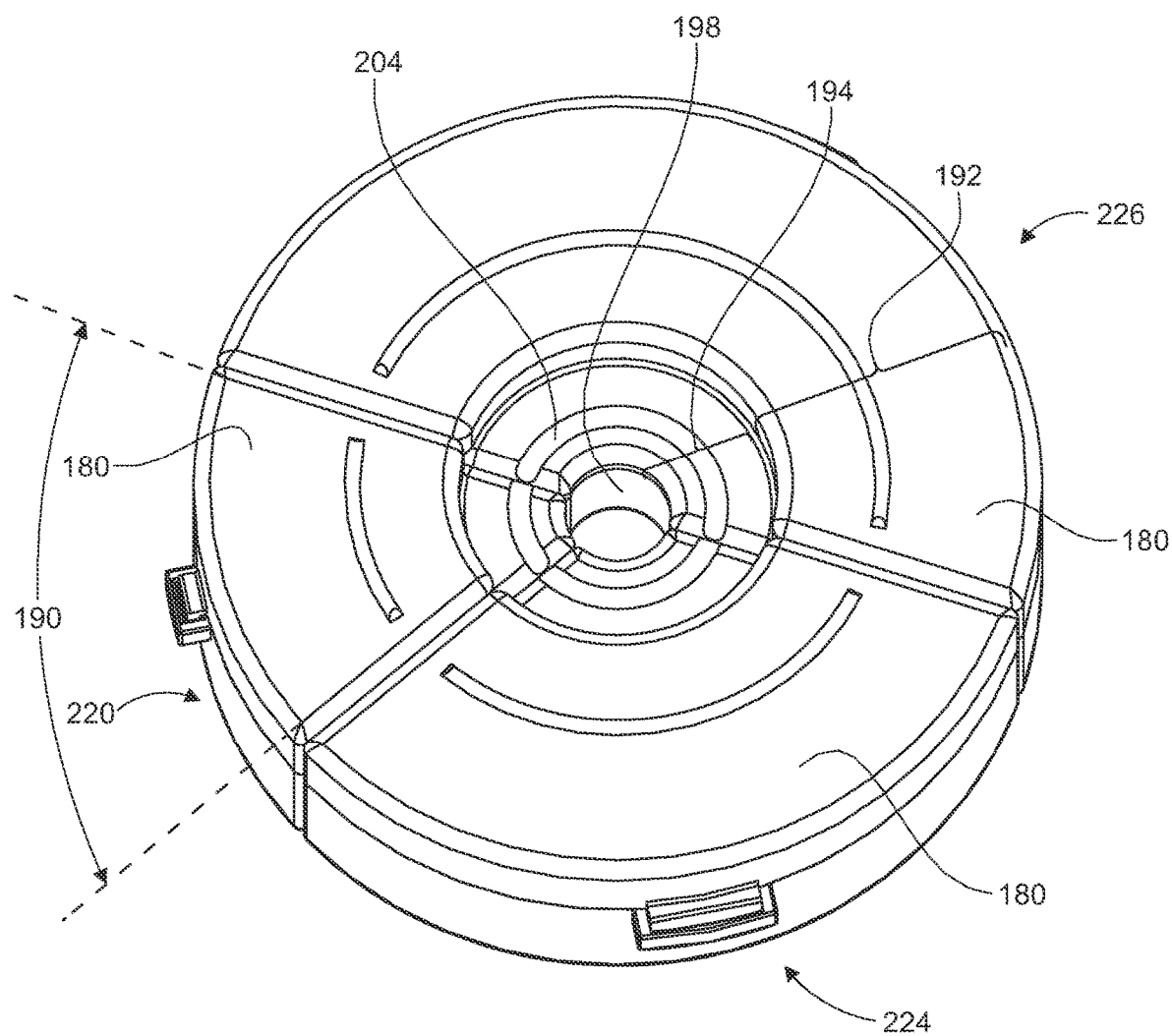
FIG. 7 illustrates an isometric view of the containers of the portable container system.

Referring to FIG. 7, an isometric view of the containers of the portable container system is shown.

Each container 180 is divided into a main section 192 and a mating section 194.

Main section 192 is where the bulk of the food is held. Mating section 194 is the part interfaced with by the hub no (see FIG. 1).

The hub 110 passes through central hole 198, the space left in the center between any mounted containers 180.

Each container 180 occupies a container angle 190. Shown are a 60-degree container 220, a 120-degree container 224, and a 180-degree container 226.

The alignment ring, shown here as lid groove 204, is created by the combination of multiple containers 180 placed such that they form a complete circular registration feature.

Figure 8:
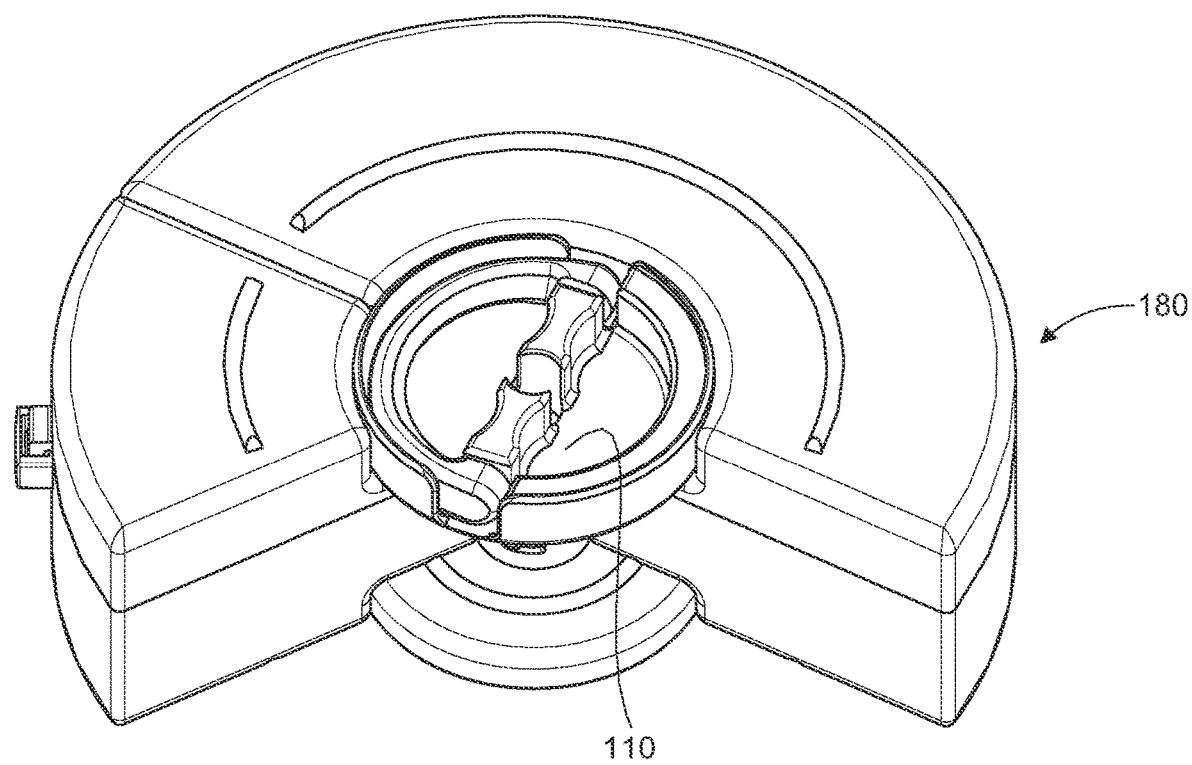
FIG. 8 illustrates a second isometric view of the portable container system.
Figure 9:
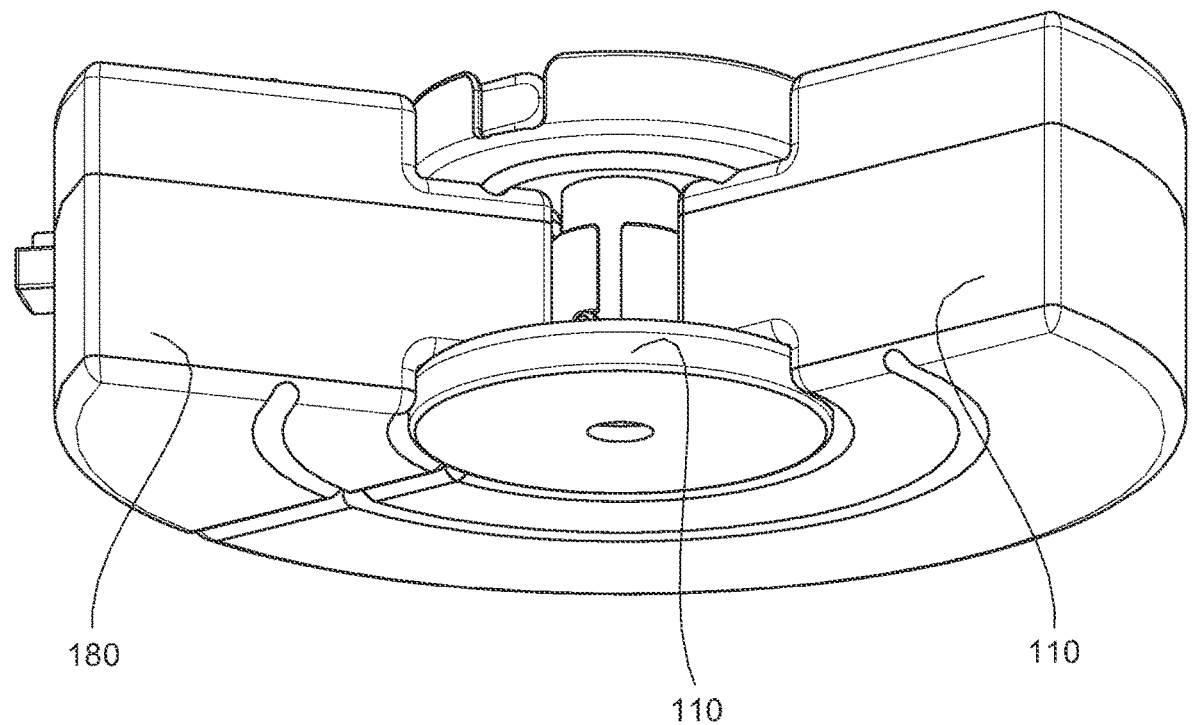
FIG. 9 illustrates a third isometric view of the portable container system.

Referring to FIGS. 8 and 9, second and third isometric views of the portable container system are shown.

The portable container system 100 is shown with fewer containers than maximum capacity. The compression of the hub 110 against the containers 180 holds the containers 180 in place, even with a section of the hub 110 left empty.

Figure 10:
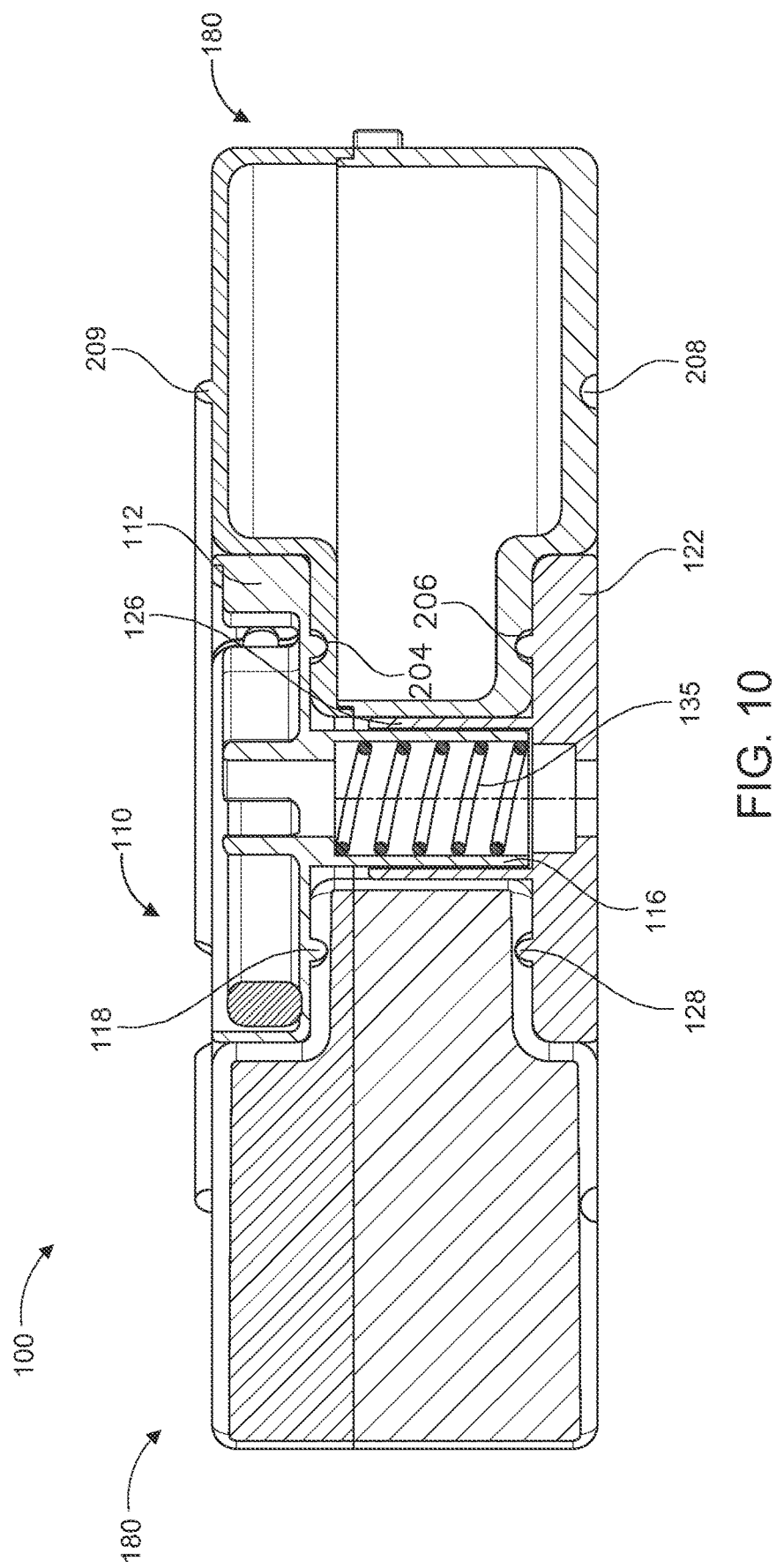
FIG. 10 illustrates a cross-section of the portable container system.

Referring to FIG. 10, a cross-section of the portable container system is shown.

The hub 110 is shown holding containers 180. The upper rib 118 interfaces with the lid groove 204. The lower rib 128 interfaces with the vessel groove 206.

The spring 135 is visible nested within the upper cylinder 116 and lower cylinder 126. The spring is compressed as the hub upper section 112 is pushed toward the hub base 122. When the release of a locking mechanism 130 (see FIG. 4), the spring 135 creates a popping action, pushing the hub upper section 112 away from hub base 122.

In this cross-sectional view, it is apparent that the bottom of the containers 180 shares the same plane as the bottom of the hub 110.

The result is that the portable container system is stable and sturdy because the weight of the entire device is supported across the bottom of both the containers and the hub.

The stacking groove 208 and stacking rib 209 interact with additional portable container systems 100 placed above, or below, each other. The result of the interaction between the stacking grooves 208 and stacking ribs 209 is to align multiple portable container systems 100, creating a common central axis.

By allowing the stacking grooves 208 and stacking ribs 209 to interact with each other, the multiple systems 100 are aligned.

Figure 11:
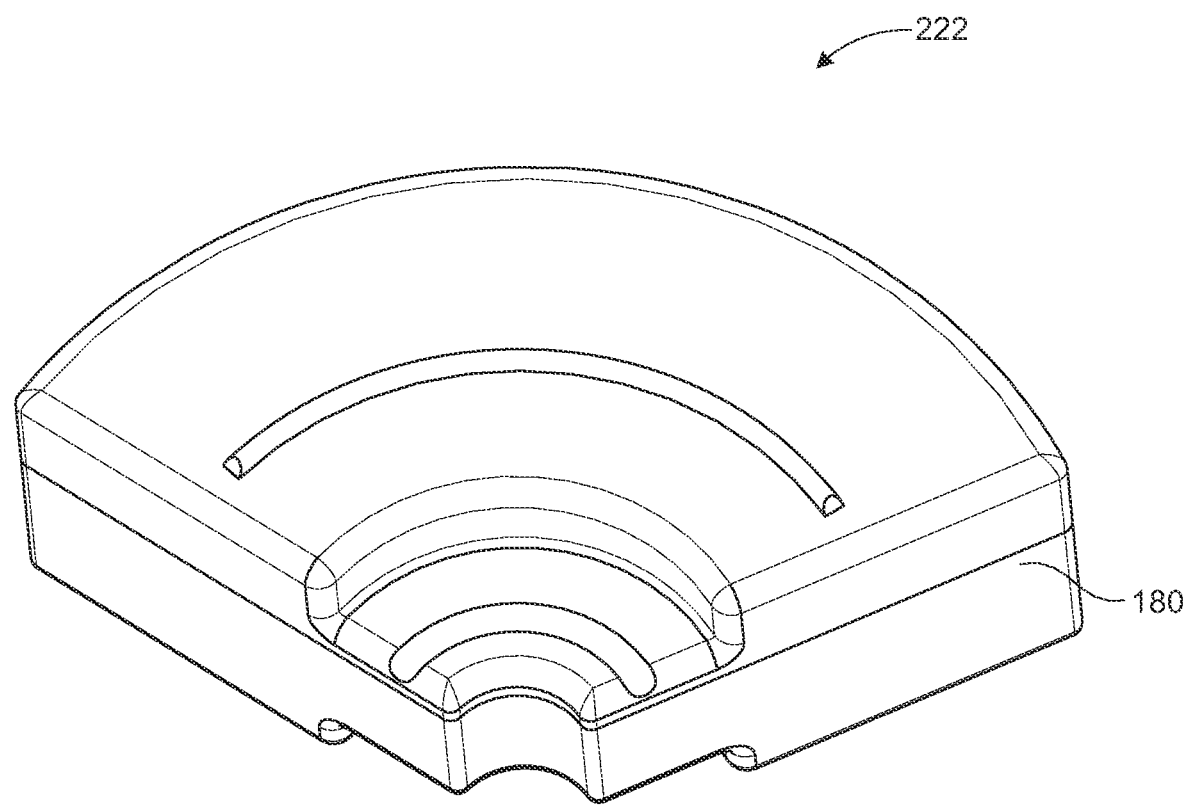
FIG. 11 illustrates an isometric view of a 90-degree container of the portable container system.

Referring to FIG. 11, an isometric view of a 90-degree container of the portable container system is shown.

Container 180 is shown as a 90-degree container 222.

Figure 12:
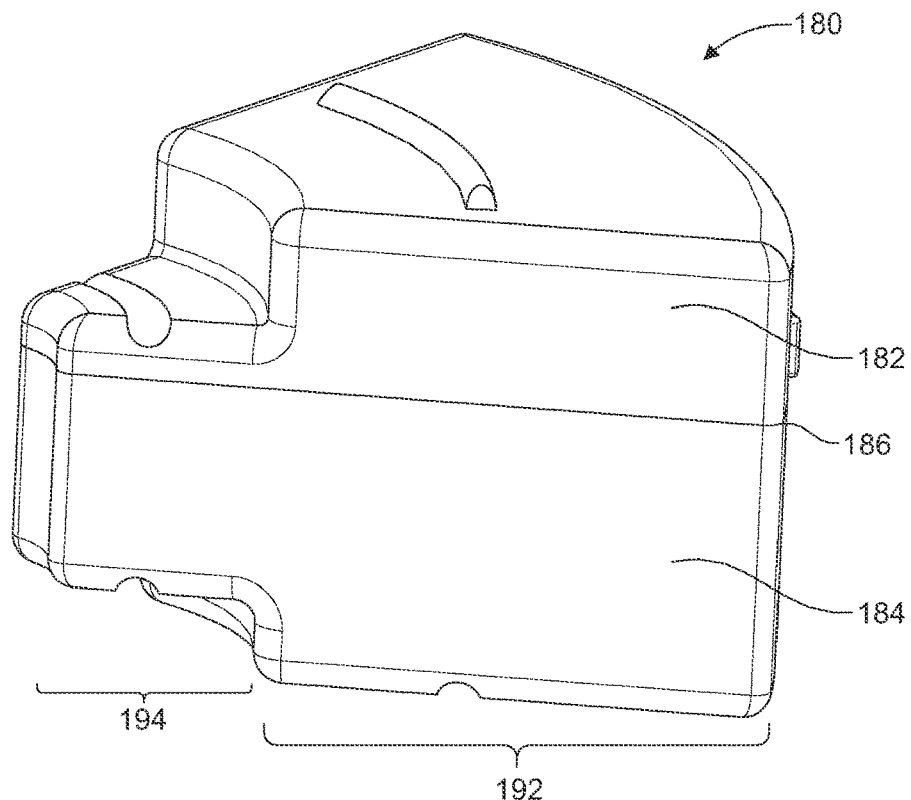
FIG. 12 illustrates an isometric view of the first embodiment of the containers of the portable container system.
Figure 13:
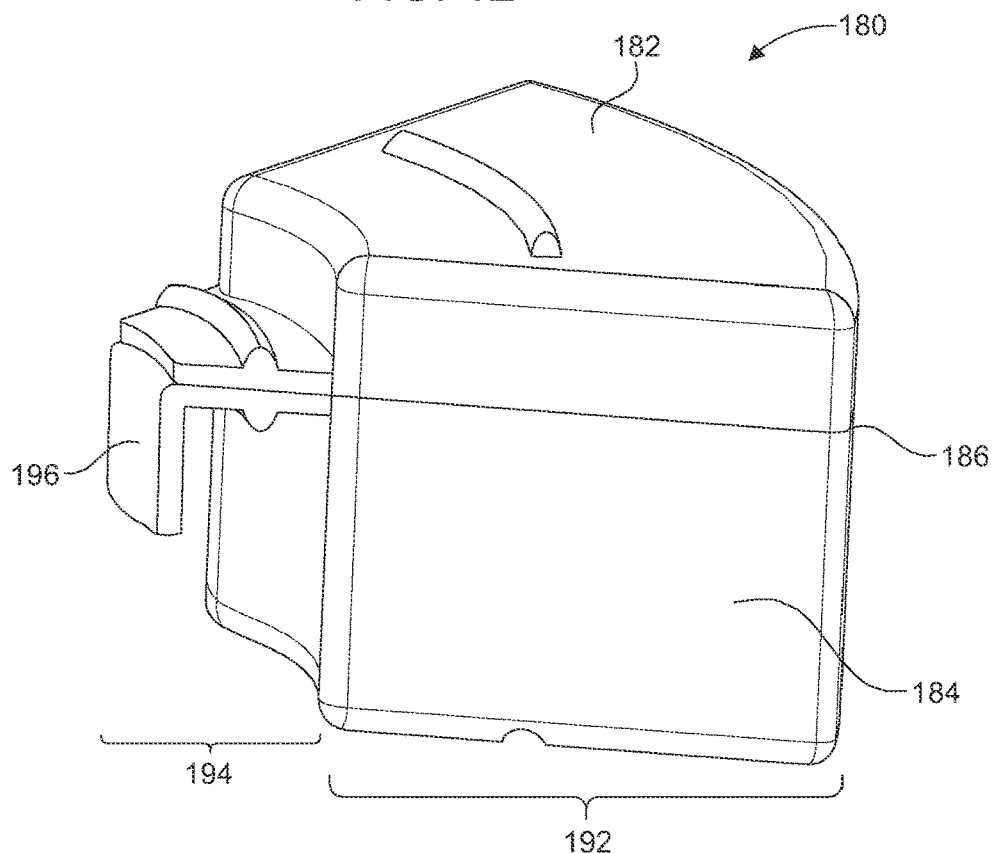
FIG. 13 illustrates an isometric view of the second embodiment of the containers of the portable container system.

Referring to FIGS. 12 and 13, isometric views of the first and second embodiments of the containers of the portable container system are shown.

Each container 180 includes a lid 182 and vessel 184 that meet at a junction 186. The main sections 192 are substantially identical across the first and second embodiments.

The difference between the two embodiments can be seen by comparing the mating sections 194.

The first embodiment, shown in FIG. 12, can store food in the mating section 194. In contrast, the second embodiment, shown in FIG. 13, does not store food within the mating section 194. Instead, the mating section 194 of the vessel 184 is moved upward. An optional retaining tab 196 is created to allow the user to grip the container 180 for efficient dispensing.

Figure 14:
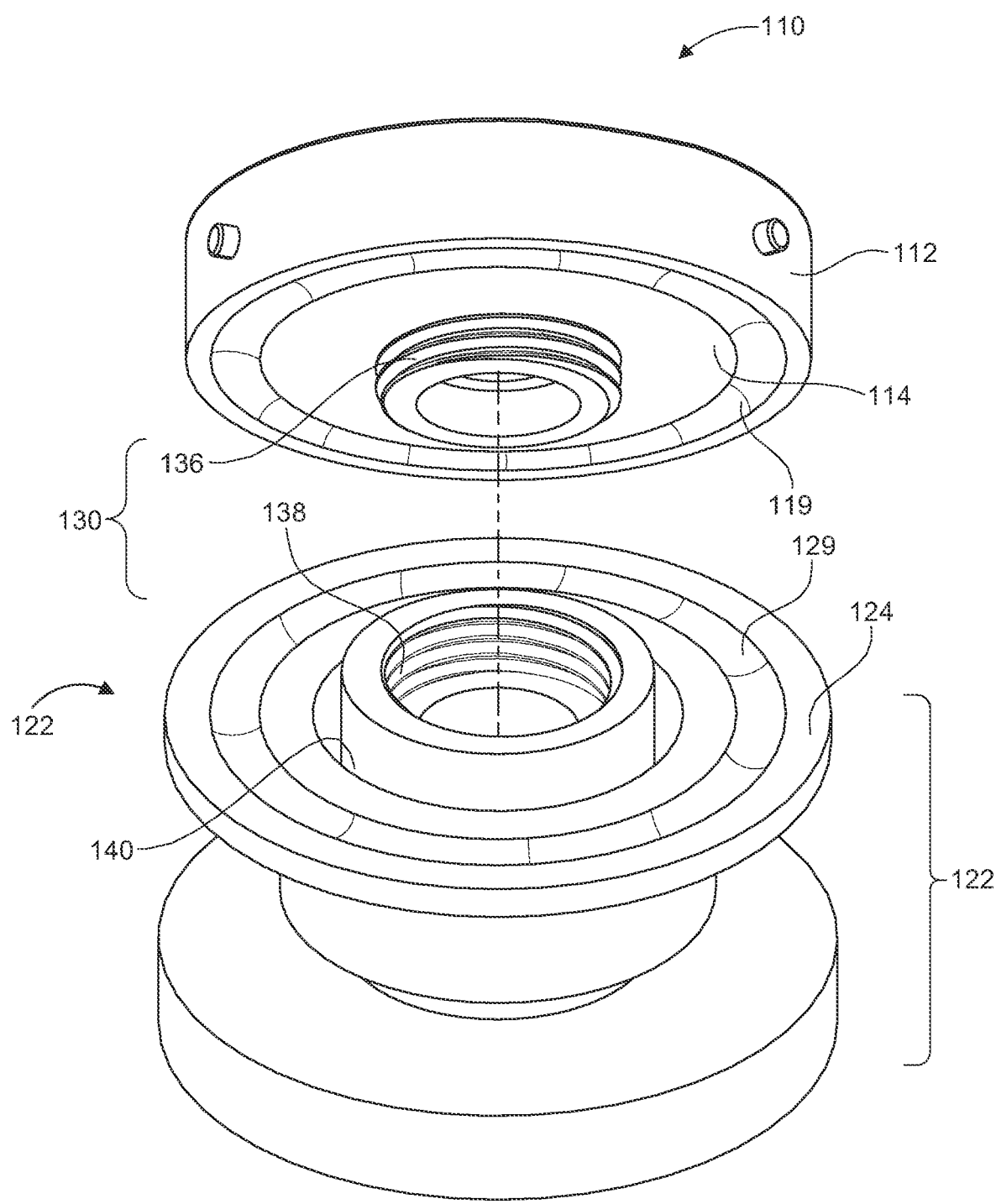
FIG. 14 illustrates a first isometric view of a second embodiment of the hub of the portable container system.

Referring to FIG. 14, a first isometric view of a second embodiment of the hub of the portable container system is shown.

The hub 110 again includes a hub upper section 112, upper plate 114, hub base 122, upper groove 119, and lower groove 129. In the second embodiment of the hub, the hub upper section and hub base contain grooves as opposed to ribs.

Regarding the use of grooves or ribs, the hub and the container can each be formed with either grooves or ribs, so long as the opposing surface uses the opposite. For example, the food container can include upward-facing ribs and downward-facing grooves with the mating hub services having the opposite. Alternative arrangements that mix-and-match grooves and ribs are anticipated. The goal is alignment by mating a groove and a rib, without requiring the hub or the food container to have grooves or ribs specifically.

In this second embodiment, the hub upper section 112 attaches to the hub base 122 via a male-threaded protrusion 136 and a female-threaded recess 138.

The releasable locking mechanism 130 of the second embodiment is the combination of a male-threaded protrusion 136 and a female-threaded recess 138.

Figure 15:
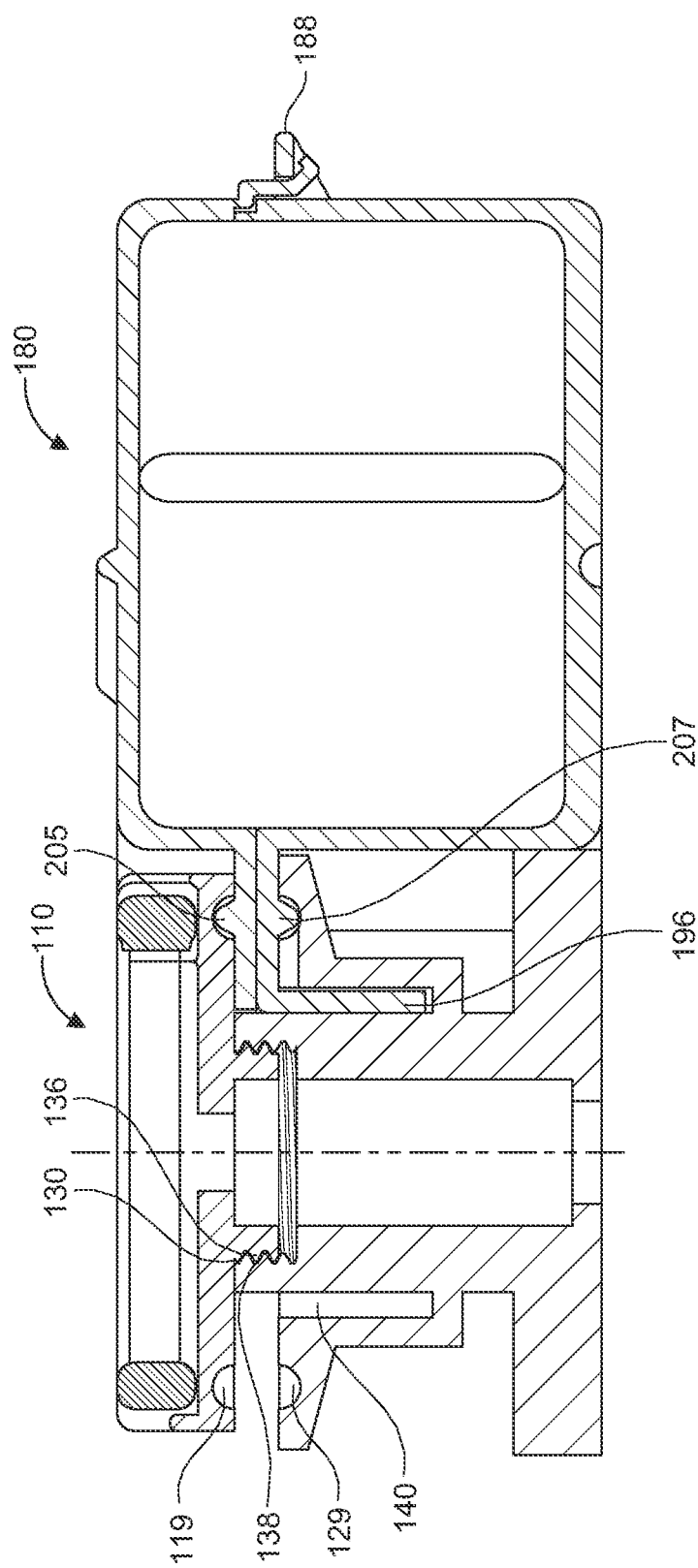
FIG. 15 illustrates a cross-section of the second embodiment hub and a container of the portable container system.

Referring to FIG. 15, a cross-section of the second embodiment hub and container of the portable container system is shown.

The hub 110 is shown holding container 180. The upper groove 119 interfaces with the lid rib 205. The lower groove 129 interfaces with the vessel rib 207.

The retaining tab 196 sits within the tab gap 140.

The releasable locking mechanism 130 of the second embodiment is the combination of a male-threaded protrusion 136 and a female-threaded recess 138.

In this cross-sectional view, it is apparent that the bottom of the food containers 180 shares the same plane as the bottom of the hub 110.

Again shown is hinge construct 188.

Figure 16:
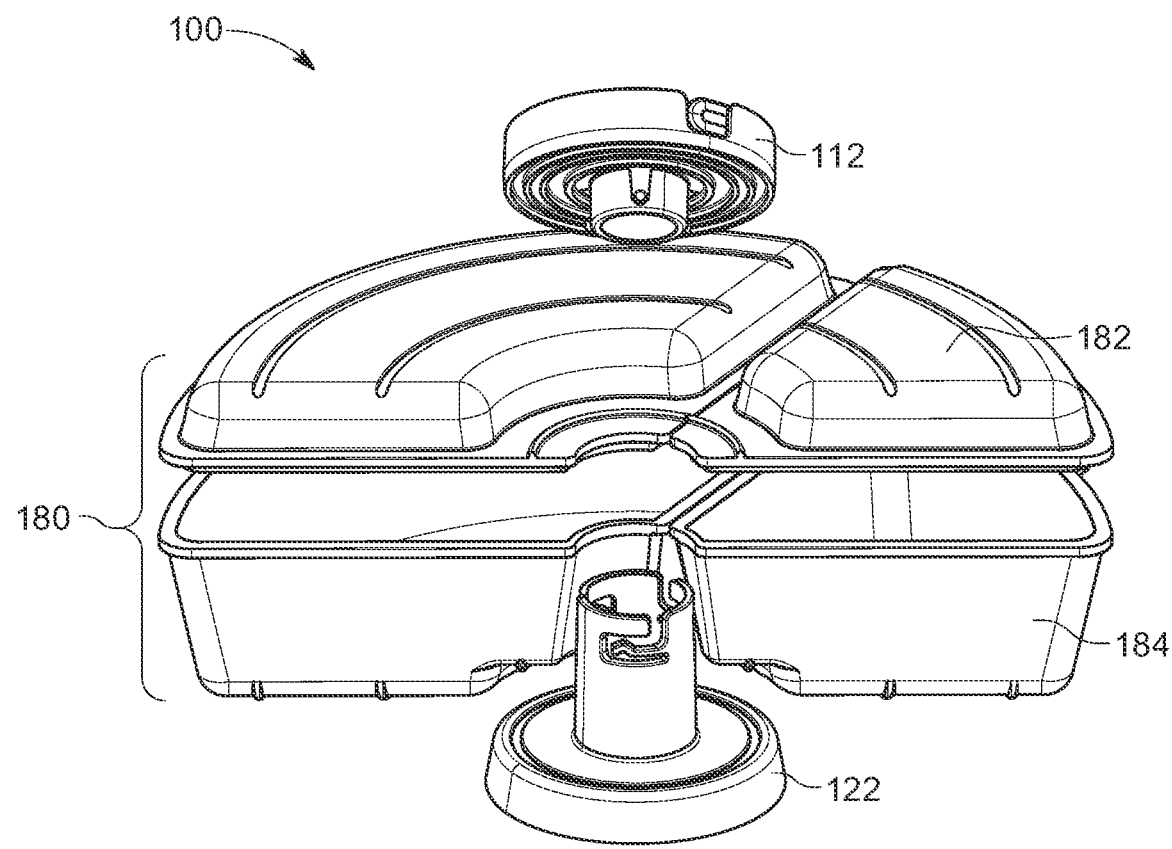
FIG. 16 illustrates a side and partially exploded view of the hub and containers of a third embodiment of the portable container system.

Referring to FIG. 16, side and partially exploded views of the hub and containers of a third embodiment of the portable container system are shown.

The portable container system 100 is shown with hub upper section 112 and hub base 122. Again shown are containers 180 formed from lid 182 and base 184.

Figure 17:
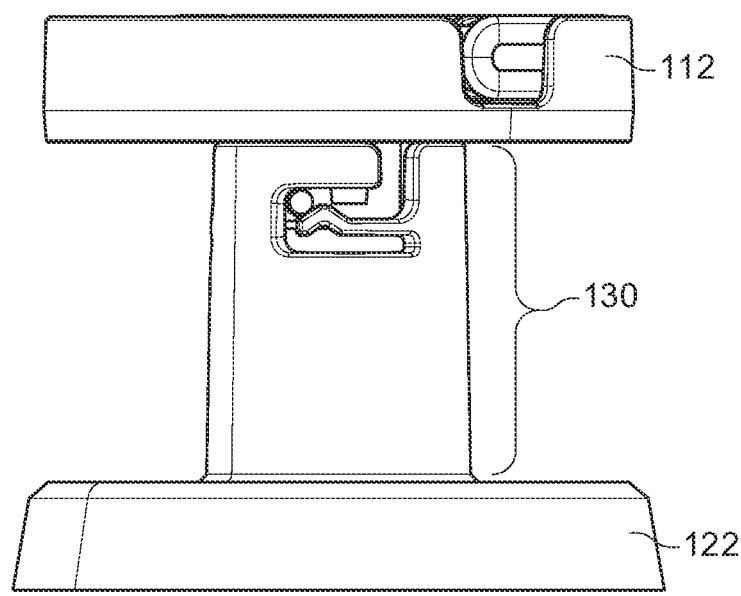
FIG. 17 illustrates a view of the hub in a closed position of the portable container system.
Figure 18:
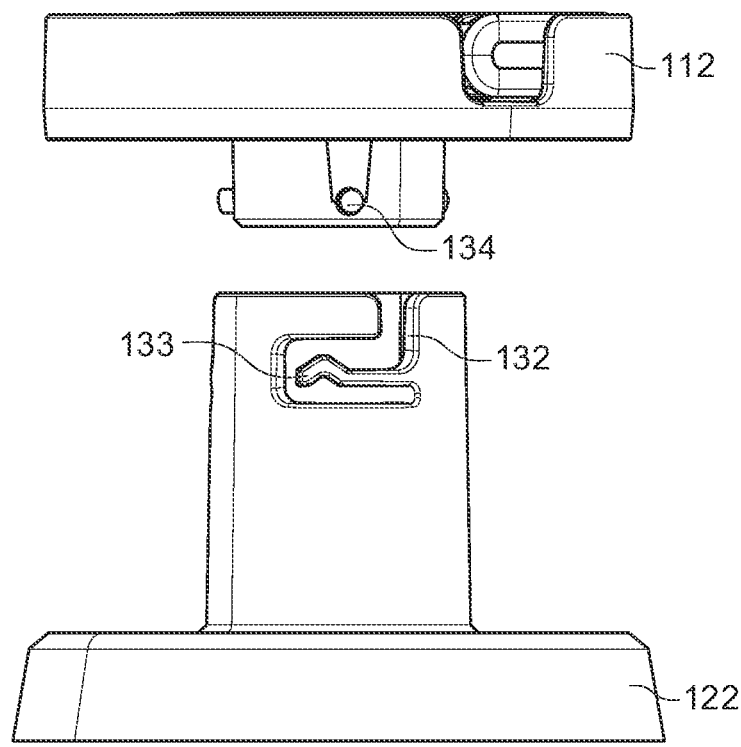
FIG. 18 illustrates a view of the hub in an open position of the portable container system.

Referring to FIGS. 17 and 18, views of the hub in closed and open positions are shown.

The releasable locking mechanism 130 is shown in this embodiment formed from slot 132, latch 133, and pin 134. To lock, the pin 134 passes through slot 132, across the latch 133, which resiliently deforms to hold the pin 134 in place.

The hub upper section 112 and hub base 122 are also shown.

Figure 19:
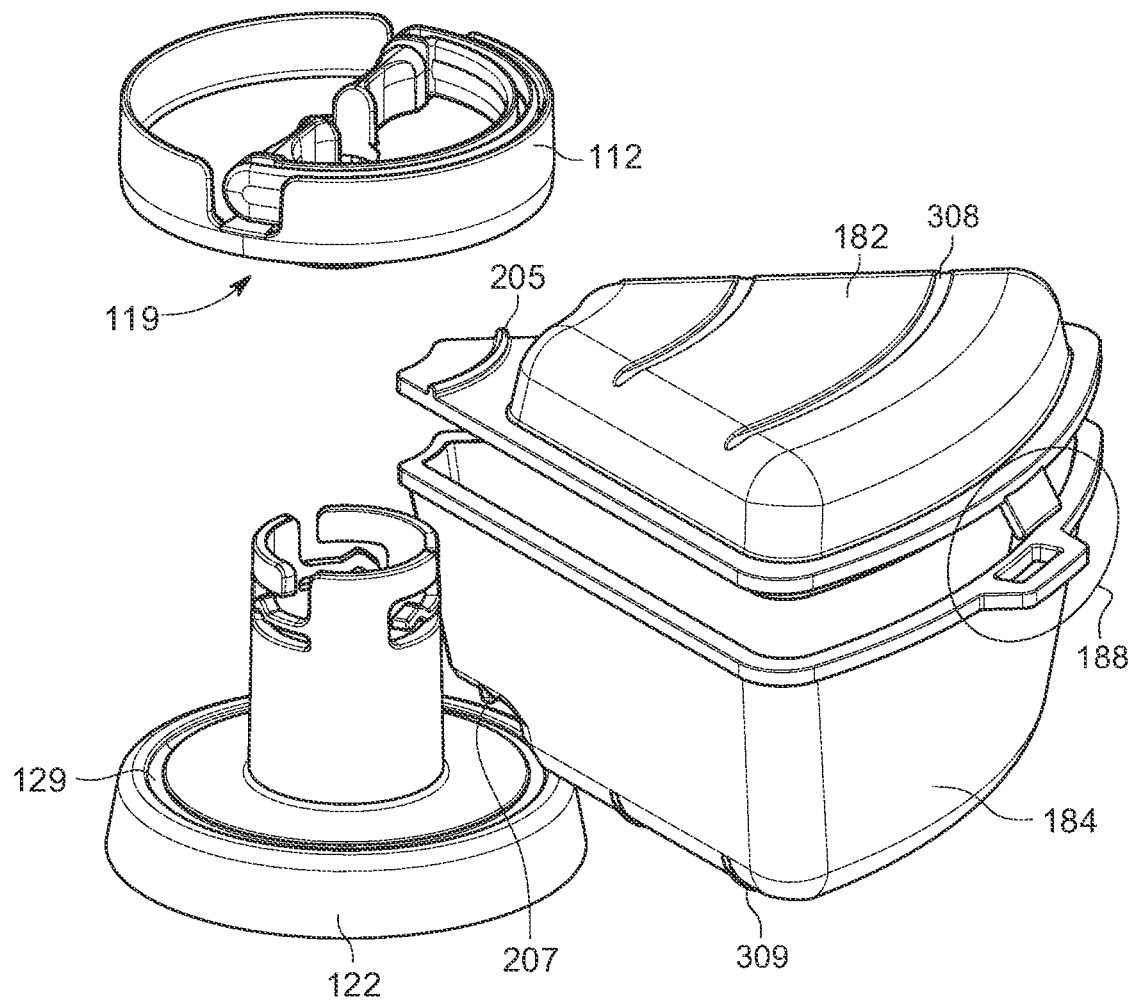
FIG. 19 illustrates a second side and partially exploded view of the hub and containers of the third embodiment of the portable container system.

Referring to FIG. 19, a second side and partially exploded view of the hub and containers of the third embodiment of the portable container system is shown.

The hub upper section 112 is shown with upper groove 119 that interacts with lid rib 205 of lid 182.

Hub base 122 is shown with lower groove 129 that interacts with rib 207 of vessel 184.

Also shown is hinge construct 188.

Figure 20:
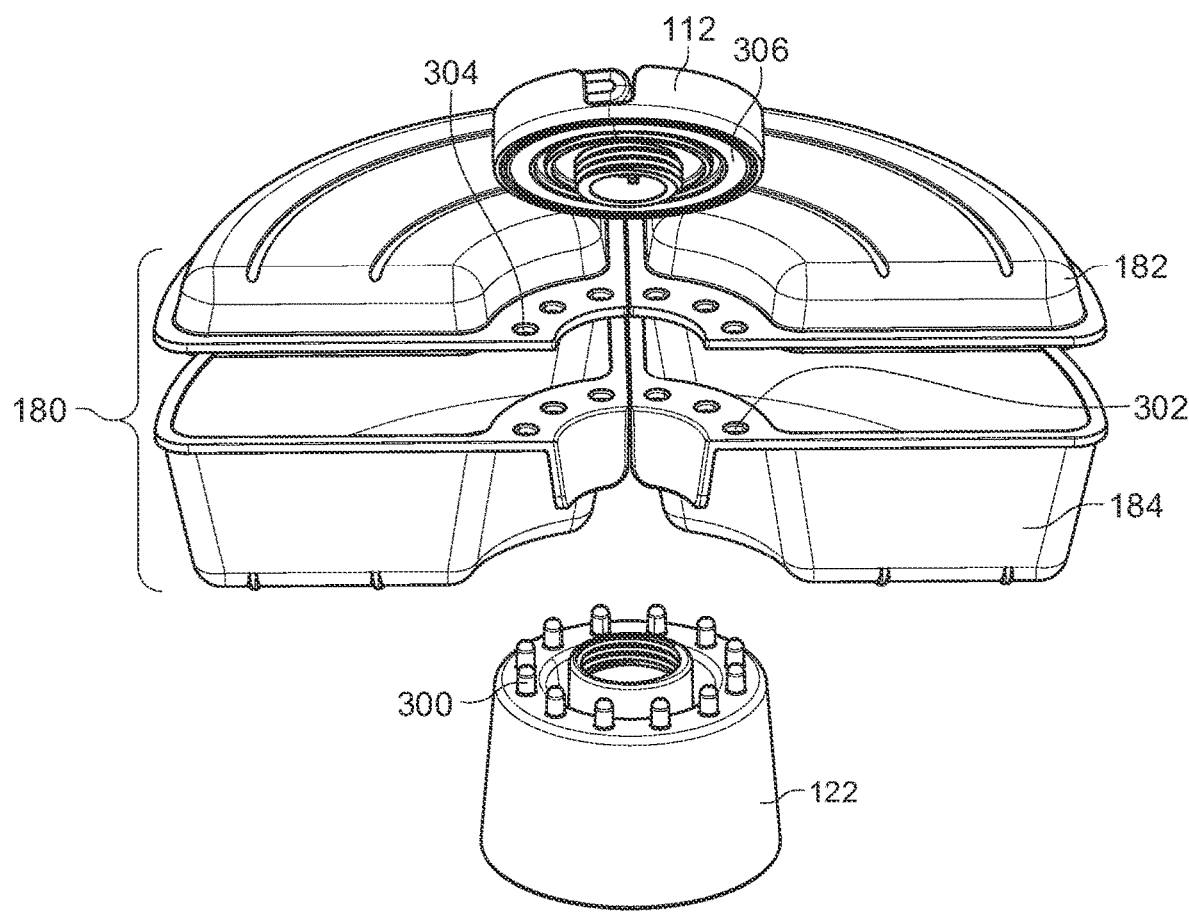
FIG. 20 illustrates a side and partially exploded view of the hub and containers of a fourth embodiment of the portable container system.
Figure 21:
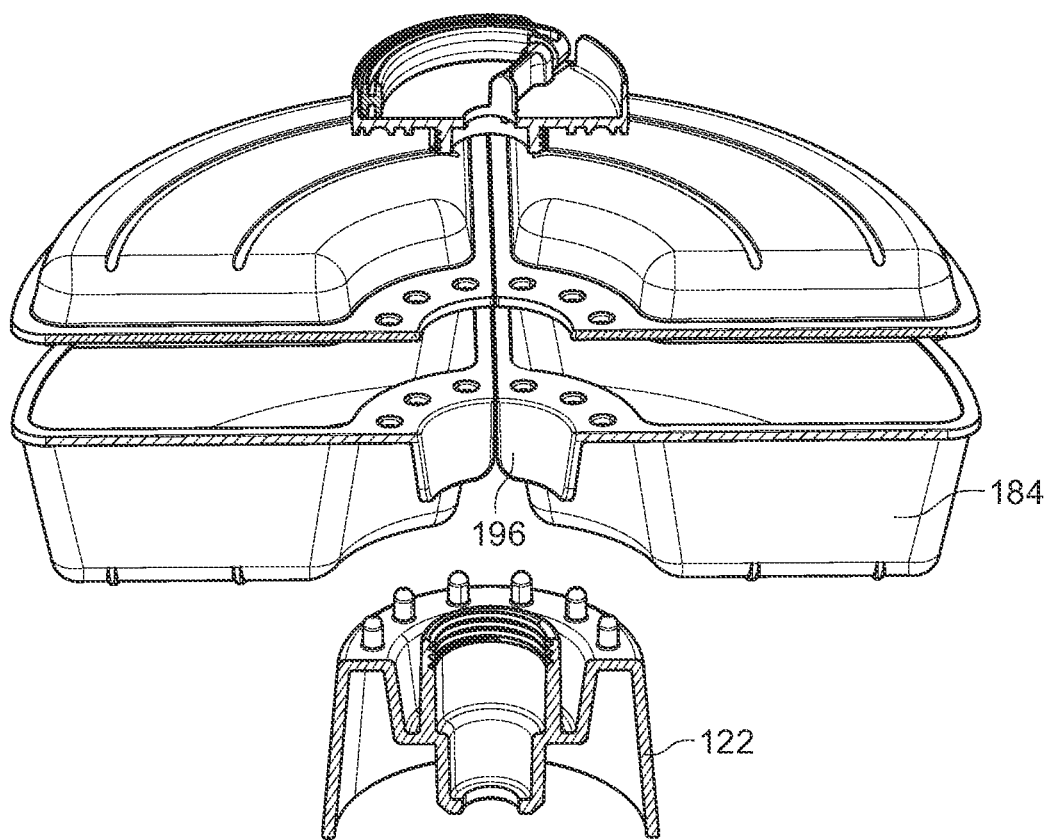
FIG. 21 illustrates a cross-section of the fourth embodiment of the portable container system.
Figure 22:
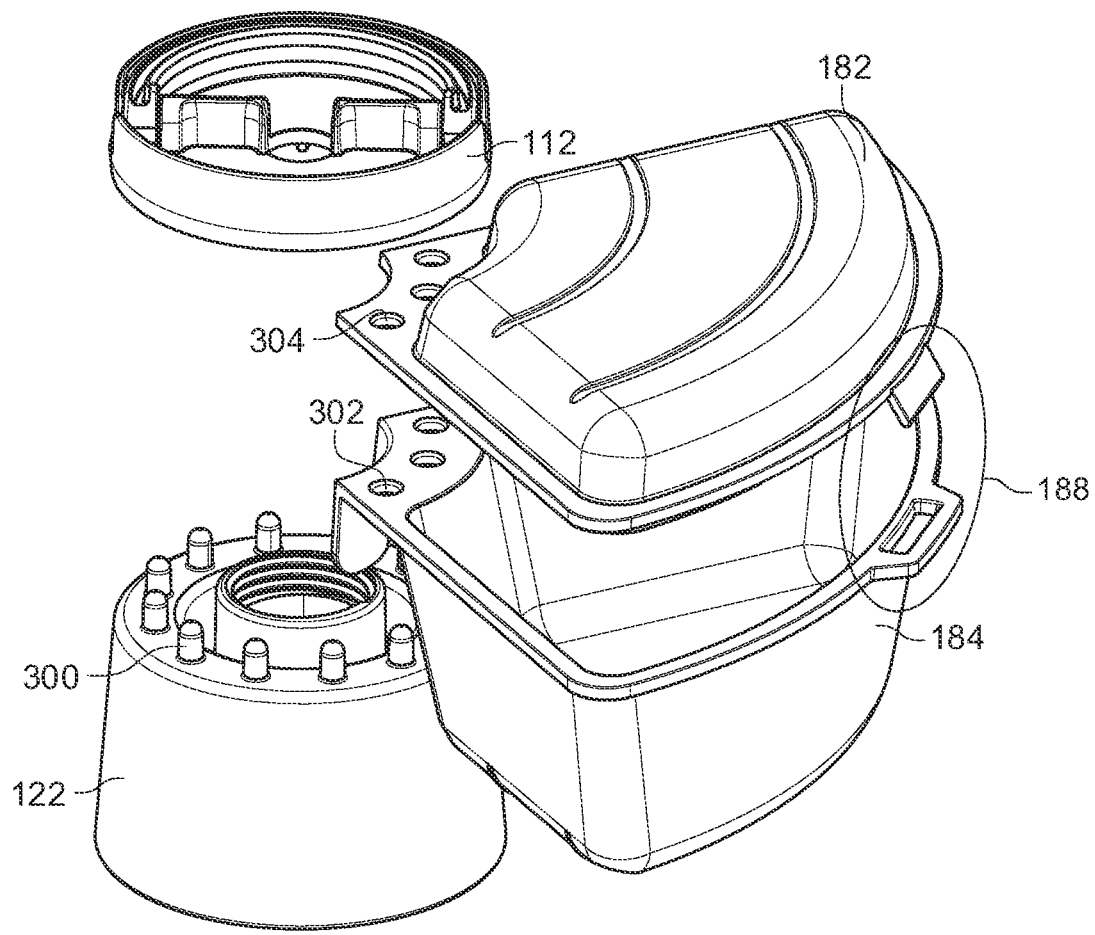
FIG. 22 illustrates a second side and partially exploded view of the hub and containers of the fourth embodiment of the portable container system.

Referring to FIGS. 20, 21, and 22, side and partially exploded, cross-section, and second side views of the hub and containers of a fourth embodiment of the portable container system are shown.

In this embodiment, the container 180 locations are registered with respect to the hub base 122. This registration, or locking at specific locations, is accomplished by the interaction of pegs 300 with lower holes 302 in the vessel 184 and upper holes 304 in the lid 182. This interaction between the pegs 300 that protrude, and the holes 302/304 creates discrete locations for the containers 180. The discrete locations prevent container 180 motion during transportation.

The pegs 300 are set at regularly-spaced angles with respect to the hub base 122, for example, every 30 degrees. Other angles are anticipated, with a preference for angles that would include at least one pin for even the smallest container size. For example, if the smallest or narrowest container is 45 degrees, a peg 300 would be required every 45 degrees, for a total of eight pegs.

In this embodiment, a retaining tab 196 aligns the base 184 with the hub base 122.

Figure 23:
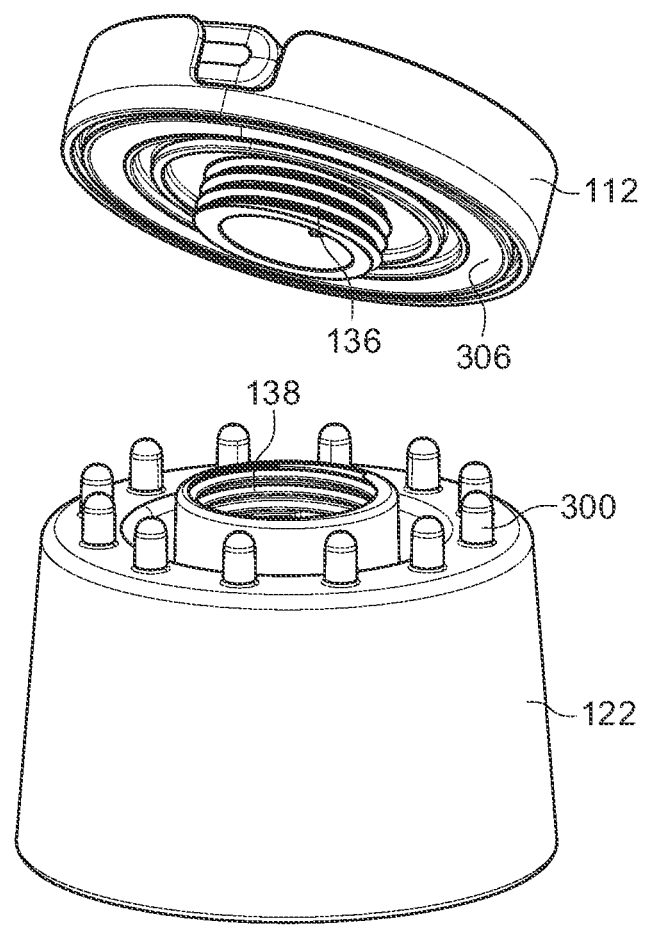
FIG. 23 illustrates a view of the hub in an open position of the fourth embodiment of the portable container system.

Referring to FIG. 23, a view of the hub in an open position of the fourth embodiment of the portable container system is shown.

The hub 110 is shown formed from hub upper section 112 and hub base 122, which connect via male-threaded protrusion 136 and female-threaded recess 138.

To allow the hub upper section 112 to thread into the hub base 122 via the male-threaded protrusion 136 and the female-threaded recess 138, a receiving groove 306 is present. The use of a continuous groove allows the hub upper section 112 to hold the containers 180 in place with respect to the hub base 122 without being limited with respect to angular position.

Also shown are the pegs 300 that interact with the receiving groove 306.

Figure 24:
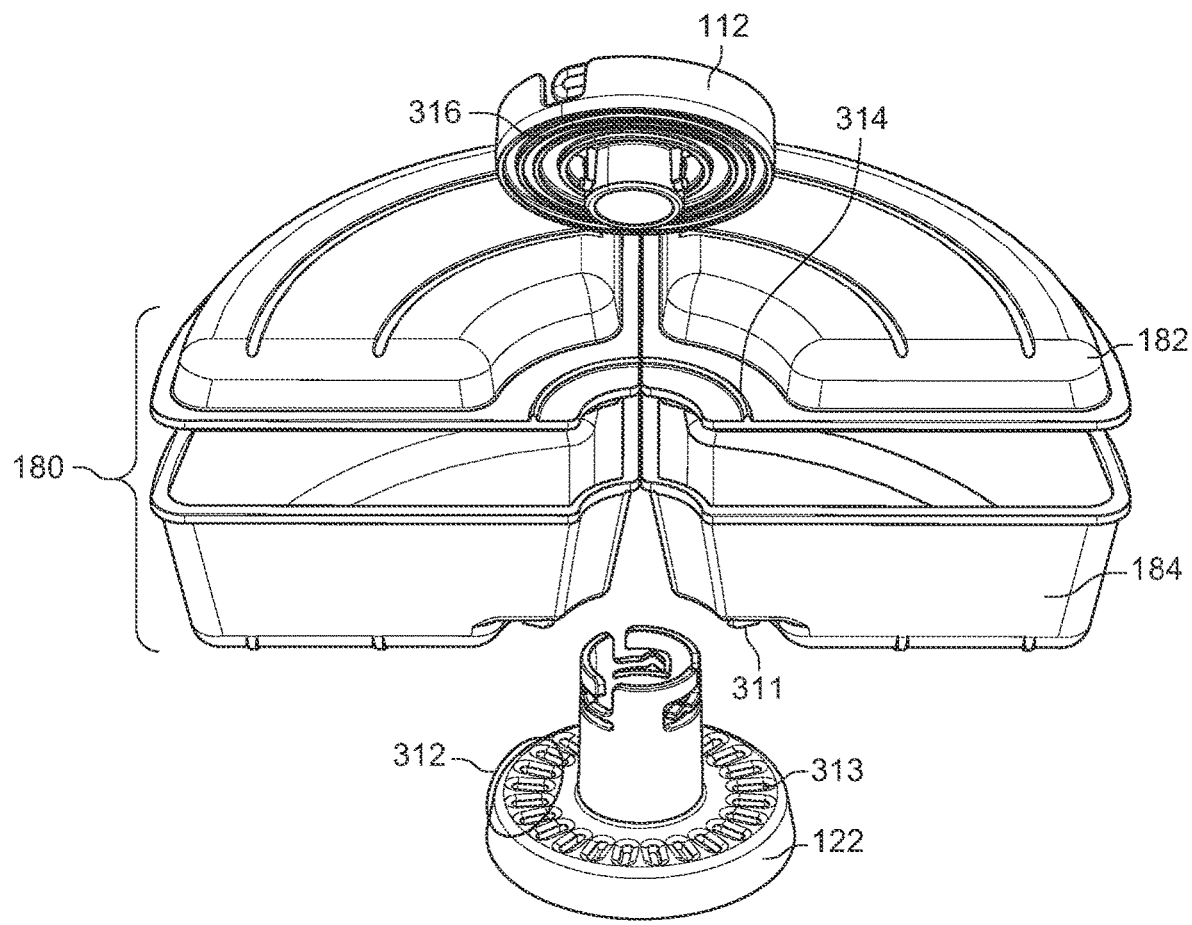
FIG. 24 illustrates a partial lower view of a fifth embodiment of the portable container system.
Figure 25:
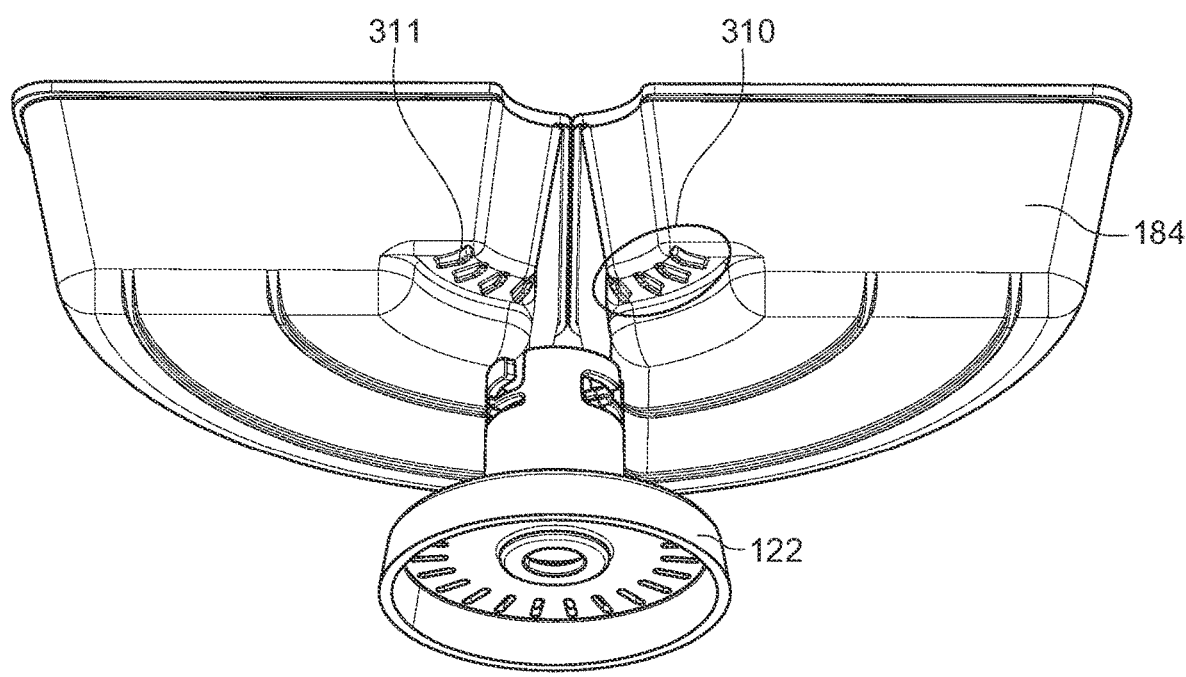
FIG. 25 illustrates a side and partially exploded view of the hub and containers of the fifth embodiment of the portable container system.

Referring to FIGS. 24 and 25, partial lower, side and partially exploded, views of the fifth embodiment of the portable container system are shown.

In this embodiment the registration apparatus that aligns containers 180 with respect to the hub 110 takes the form of a protrusion pattern 310 and a slot pattern 312. The protrusion pattern 310 is formed from a plurality of radially oriented protrusions 311. The slot pattern 312 is formed from a plurality of radially oriented slots 313. The result is that the release of the locking mechanism 130 is not the exclusive means preventing the containers 180 from motion with respect to the hub 110.

The protrusions 311 are set at a regular intervals, resulting in at least one protrusion 311 for each container. Thus, as discussed above, if the narrowest container is 45 degrees, at least eight protrusions 311 would be required.

Figure 26:
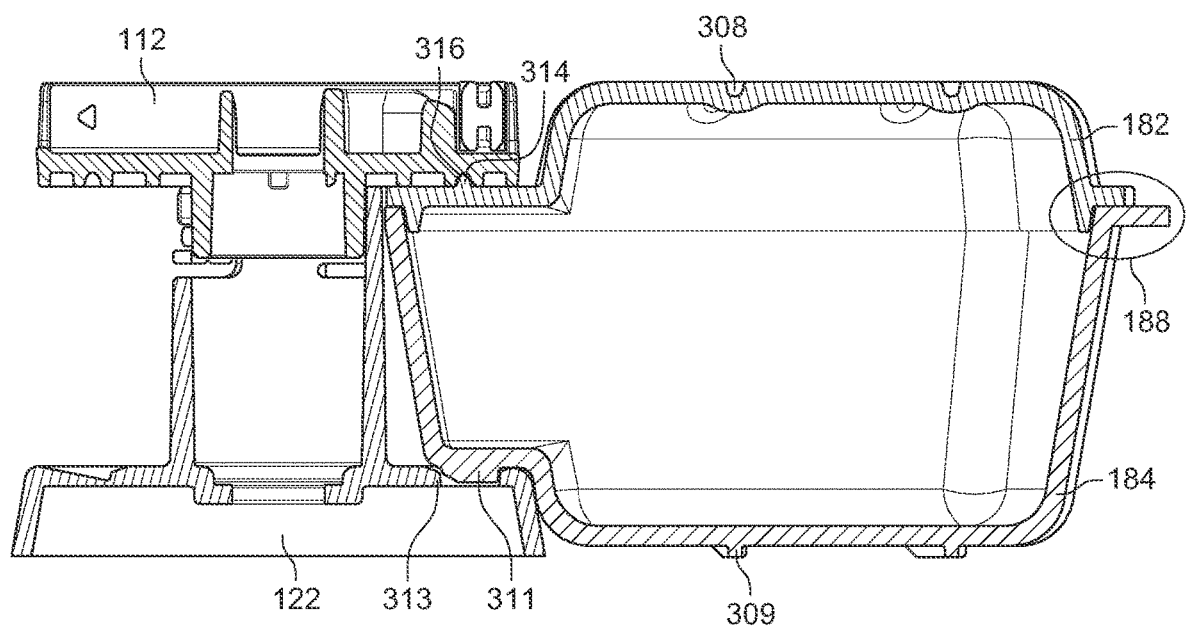
FIG. 26 illustrates a cross-section of the fifth embodiment hub and a container of the portable container system.

Referring to FIG. 26, container 184 sits mounted to hub base 22. Protrusion 311 sits in slot 313, and registration rib 314 sits in groove 316. Also shown are stacking groove 308 and stacking rib 309.

Figure 27:
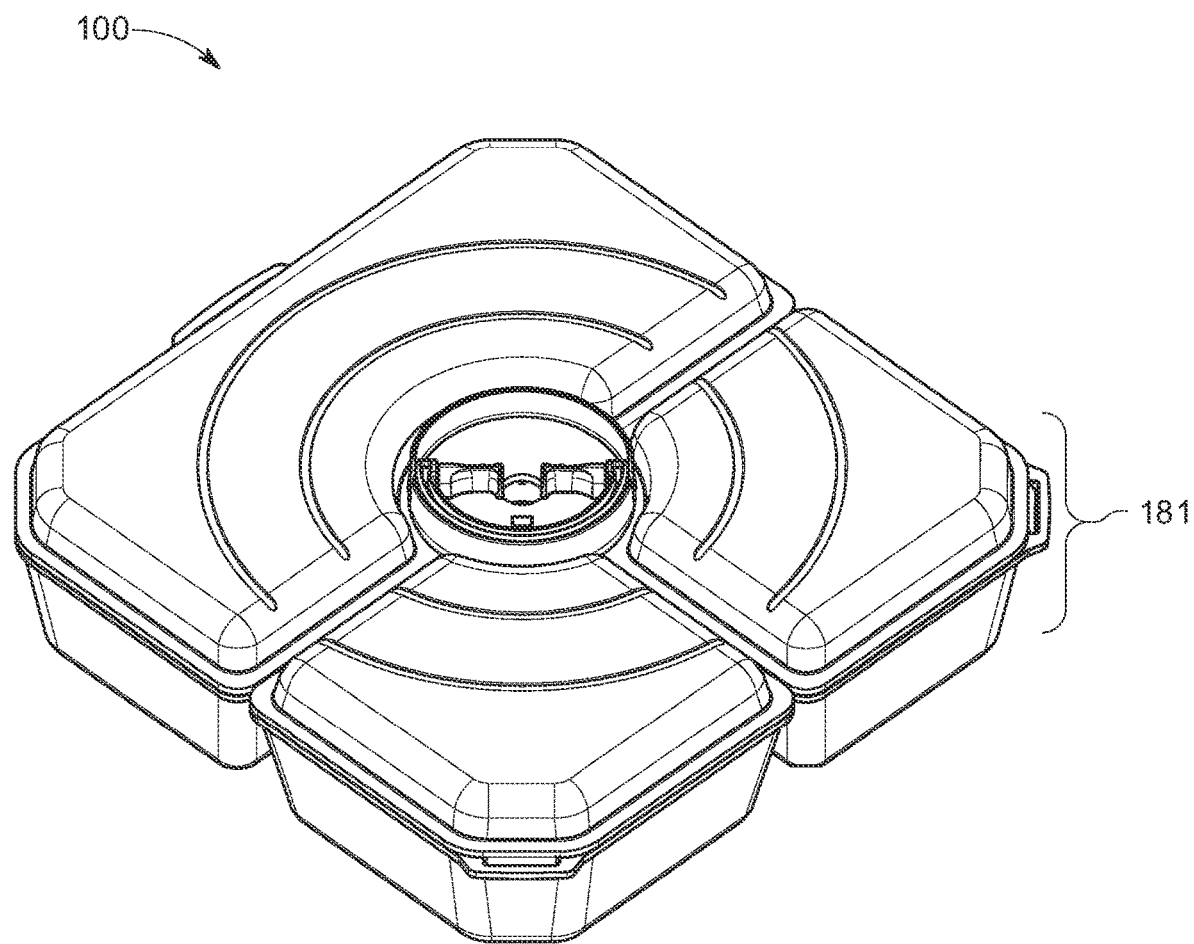
FIG. 27 illustrates an isometric view of the hub and containers of a sixth embodiment of the portable container system.
Figure 28:
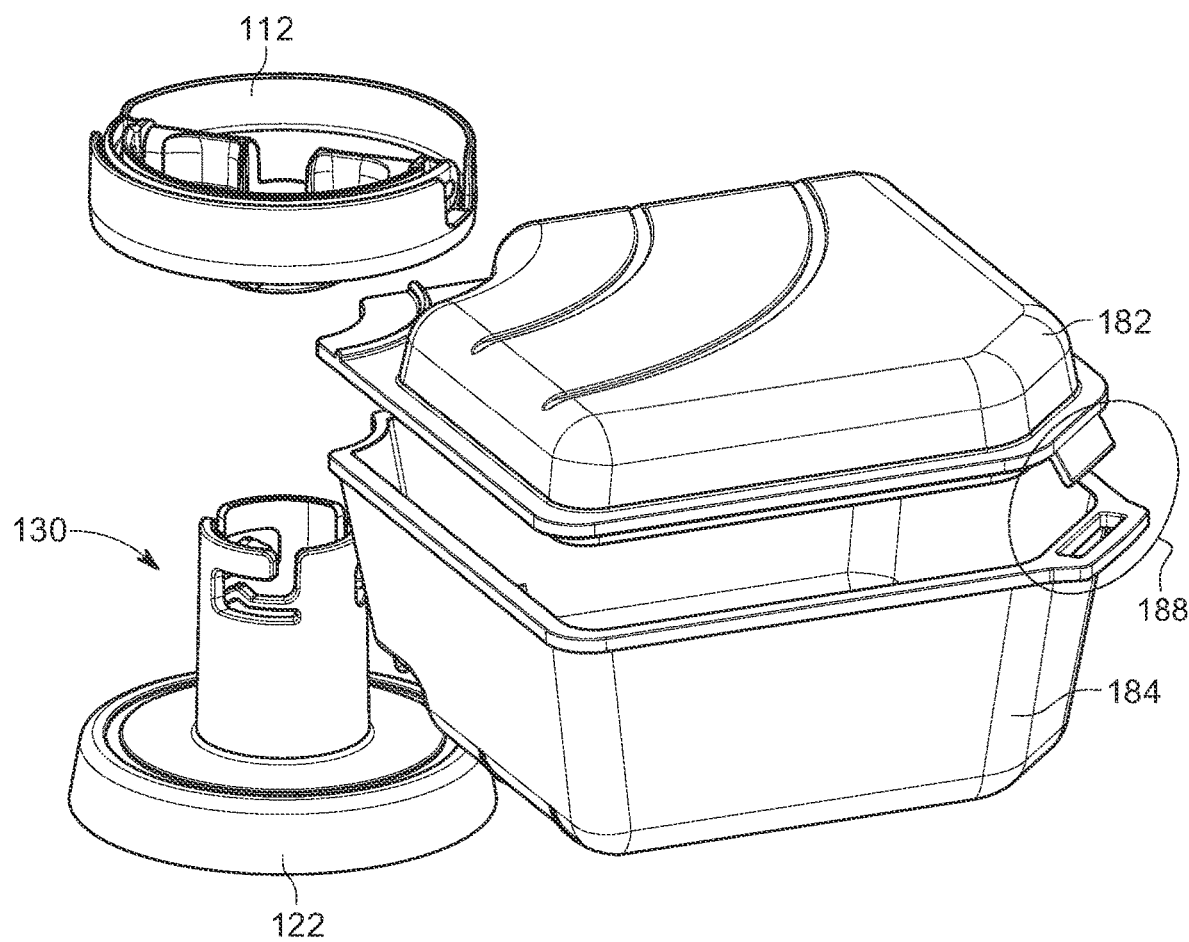
FIG. 28 illustrates a side and partially exploded view of the hub and containers of the sixth embodiment of the portable container system.

Referring to FIGS. 27 and 28, views of the hub and containers of a sixth embodiment of the portable container system are shown.

The embodiment shown has a square profile using square profile containers 181, rather than the round profile of the other embodiments.

The square profile containers 181 can use the hub upper section 112 and hub base 122 of the other embodiments, which connect at a releasable locking mechanism 130.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely an exemplary and explanatory embodiment thereof. It is the intention of the following claims to encompass and include such changes.

What is claimed is:

1. A portable container system comprising:
   a central locking hub;
   the central locking hub formed from a hub upper section and a hub lower section;
   the hub upper section and the hub lower section affixed to each other via a releasable locking mechanism;
   the releasable locking mechanism having an open position and a closed position;
   a first food container;
   the first food container formed from a first lid and a first vessel;
   a registration apparatus;
   the registration apparatus assigning locations at which the first food container can be affixed to the central locking hub to a collection of angular positions;
   whereby the registration apparatus prevents the first food container from motion with respect to the central locking hub,
   wherein the registration apparatus is formed from one or more protrusions and one or more slots, the one or more slots are placed along an upper face of the hub lower section, the one or more protrusions are placed along a lower face of the first vessel, and whereby the one or more protrusions fit into the one or more slots, preventing motion of the first food container with respect to the central locking hub.

2. The portable container system of claim 1, wherein:
   the registration apparatus assigns a location of the first food container through interaction between the hub lower section and the first vessel.

3. The portable container system of claim 1, further comprising:
   a circular groove recessed into the hub upper section;
   a rib comprising a segment of a circle, protruding from the first lid;
   the rib fitting into the circular groove, preventing motion of the first food container with respect to the central locking hub.

4. A system for transportation of two or more containers, the system comprising:
   a central hub;
   the central hub formed from a hub upper section and a hub lower section;
   the hub lower section including a first set of registration features;
   the hub upper section and the hub lower section affixed to each other via a releasable locking mechanism;
   the releasable locking mechanism having an open position and a closed position;
   one or more containers, each of the one or more containers formed from a lid and a vessel;
   each vessel including a second set of registration features;
   the first set of registration features interacts with the second set of registration features to determine where the vessel can interface with the hub lower section of the central hub,
   wherein the first set of registration features is pegs protruding upward from the hub lower section, the second set of registration features is holes passing through the vessel, and the one or more containers are aligned with the central hub through interaction of the pegs and holes.

5. The system for transportation of two or more containers of claim 4, wherein:
   the first set of registration features and the second set of registration features assign a location of the one or more containers through interaction between the hub lower section and the vessel of the one or more containers.

6. The system for transportation of two or more containers of claim 4, further comprising:
   a groove recessed into the hub upper section;
   whereby when the releasable locking mechanism is in the closed position, the pegs pass through the holes in the one or more containers and into the groove.

7. A portable container system comprising:
   a first container;
   a second container;

a central circular hub;
the central circular hub having a locked position and an unlocked position;
the central circular hub compressing the first container and the second container when in the locked position;
the central circular hub releasing the first container and the second container when in the unlocked position;
a registration apparatus;
the registration apparatus assigning locations at which the first container can be affixed to the central circular hub to a collection of angular positions;
whereby a user places the central circular hub in a locked position for transportation of the first container and the second container, and the user places the central circular hub into the unlocked position for access to contents within the first container and the second container
wherein the registration apparatus is formed from one or more protrusions and one or more slots, the one or more slots are placed along an upper face of a hub lower section of the central circular hub, the one or more protrusions are placed along a lower face of the first vessel,
whereby the one or more protrusions fit into the one or more slots, preventing motion of the first container with respect to the central circular hub.

8. The portable container system of claim 7, wherein:
the registration apparatus assigns a location of the first container through interaction between the central circular hub and a first vessel of the first container.

9. The portable container system of claim 7, further comprising:
a spring that is positioned within the central circular hub, the spring assisting a movement of the central circular hub from the locked position to the unlocked position.

10. The portable container system of claim 1, wherein a bottom surface of the first vessel is positioned on a same plane as a bottom surface of the hub lower section.

11. The portable container system of claim 1, further comprising:
a second food container that is formed from a second lid and a second vessel,
wherein the one or more slots of the hub lower section comprise a plurality of slots,
wherein the second food container includes one or more protrusions that are placed along a lower face of the second vessel, and
wherein the one or more protrusions of each of the first vessel and the one or more protrusions of the second vessel each fit into at least one of the plurality of slots of the hub lower section, preventing motion of each of the first food container and the second food container with respect to the central locking hub.

12. The portable container system of claim 11, wherein each of the first food container and the second food container include an identical shape.

13. The portable container system of claim 11, wherein the first food container includes a shape that is different than a shape of the second food container.

14. The portable container system of claim 1, wherein the one or more slots of the hub lower section comprise a plurality of radially oriented slots.

15. The portable container system of claim 1, wherein the one or more protrusions comprise a plurality of radially oriented protrusions.

16. The portable container system of claim 4, wherein a bottom surface of a first vessel is positioned on a same plane as a bottom surface of the hub lower section.

17. The portable container system of claim 7, wherein a bottom surface of the first vessel is positioned on a same plane as a bottom surface of the second vessel and a bottom surface of the hub lower section.

18. The portable container system of claim 7, further comprising:
a circular groove recessed into the hub upper section;
a rib comprising a segment of a circle, protruding from the first lid;
the rib fitting into the circular groove, preventing motion of the first food container with respect to the central locking hub.

19. The portable container system of claim 7, wherein each of the first container and the second container include an identical shape.

20. The portable container system of claim 7, wherein the first container includes a shape that is different than a shape of the second container.

* * * * *